(12) United States Patent
Latif et al.

(10) Patent No.: US 7,197,047 B2
(45) Date of Patent: Mar. 27, 2007

(54) METHOD AND APPARATUS FOR TRANSFERRING DATA BETWEEN IP NETWORK DEVICES AND SCSI AND FIBRE CHANNEL DEVICES OVER AN IP NETWORK

(75) Inventors: Aamer Latif, Milpitas, CA (US); Rodney N. Mullendore, San Jose, CA (US); Joseph L. White, San Bruno, CA (US); Brian Y. Uchino, Foster City, CA (US)

(73) Assignee: Nishan Systems, Inc., Broomfield, CO (US)

( * ) Notice: Subject to any disclaimer, the term of this patent is extended or adjusted under 35 U.S.C. 154(b) by 923 days.

(21) Appl. No.: 10/138,029

(22) Filed: Apr. 30, 2002

(65) Prior Publication Data
US 2003/0091037 A1 May 15, 2003

Related U.S. Application Data

(63) Continuation of application No. 09/500,119, filed on Feb. 8, 2000, now Pat. No. 6,400,730.

(60) Provisional application No. 60/123,606, filed on Mar. 10, 1999.

(51) Int. Cl.
*H04J 3/16* (2006.01)
*H04J 3/22* (2006.01)

(52) U.S. Cl. .................................................... 370/466

(58) Field of Classification Search ................ 370/389, 370/391, 401, 365, 366; 709/230; 320/465, 320/466
See application file for complete search history.

(56) References Cited

U.S. PATENT DOCUMENTS

| | | | |
|---|---|---|---|
| 5,805,805 A | 9/1998 | Civanlar et al. | 370/409 |
| 5,894,481 A | 4/1999 | Book | 370/412 |
| 5,905,873 A | 5/1999 | Hartmann et al. | 370/389 |
| 5,996,024 A | 11/1999 | Blumenau | 709/301 |
| 6,000,020 A | 12/1999 | Chin et al. | 370/410 |
| 6,021,454 A | 2/2000 | Gibson | 710/129 |

(Continued)

FOREIGN PATENT DOCUMENTS

WO    WO 98/36537    8/1998

*Primary Examiner*—Ajit Patel
(74) *Attorney, Agent, or Firm*—Hensley Kim & Edgington, LLC

(57) ABSTRACT

A method and apparatus for transferring data between IP devices (including, but not limited to, Gigabit Ethernet devices) and SCSI or Fibre Channel devices. The device interfaces may be either SCSI, Fibre Channel or IP interfaces such as Gigabit Ethernet. Data is switched between SCSI and IP, Fibre Channel and IP, or between SCSI and Fibre Channel. Data can also be switched from SCSI to SCSI, IP to IP and FC to FC. The port interfaces provide the conversion from the input frame format to an internal frame format, which can be routed within the apparatus. The amount of processing performed by each port interface is dependent on the interface type. The processing capabilities of the present invention permit rapid transfer of information packets between multiple interfaces at latency levels meeting the stringent requirements for storage protocols. The configuration control can be applied to each port on a switch and, in turn, each switch on the network, via an SNMP or Web-based interface, providing a flexible, programmable control for the apparatus.

31 Claims, 23 Drawing Sheets

U.S. PATENT DOCUMENTS

| | | | |
|---|---|---|---|
| 6,742,090 B2 * | 5/2004 | Sanada et al. | 711/152 |
| 2002/0083285 A1 * | 6/2002 | Sanada et al. | 711/163 |
| 2004/0133570 A1 * | 7/2004 | Soltis | 707/3 |
| 2005/0286551 A1 * | 12/2005 | Berman | 370/465 |
| 2006/0005076 A1 * | 1/2006 | Brown et al. | 714/11 |

* cited by examiner

| SoIP FLAG | DESCRIPTION |
|---|---|
| SEQUENCE END | THIS BIT INDICATES IF THIS FRAME TERMINATES A SEQUENCE. THIS CORRESPONDS TO A FIBRE CHANNEL FRAME WHICH ENDS WITH AN EOFt DELIMITER. FOR CLASS 3 SEQUENCES, THE SEQUENCES INITIATOR SETS THIS BIT ON THE LAST FRAME OF THE SEQUENCE. HOWEVER, FOR CLASS 2, THIS BIT IS SET BY THE SEQUENCE RECIPIENT ON THE ACK FRAME THAT TERMINATES THE SEQUENCE<br><br>1 = LAST FRAME OF SEQUENCE<br>0 = NOT LAST FRAME OF A SEQUENCE |
| SEQUENCE START | THIS BIT INDICATES IF THIS FRAME IS THE FIRST FRAME OF A SEQUENCE. THIS CORRESPONDS TO A FIBRE CHANNEL FRAME BEGINNING EITHER WITH AN SOFi2 OR SOFi3 DELIMITER.<br><br>1 = FIRST FRAME OF SEQUENCE<br>0 = NOT FIRST FRAME OF A SEQUENCE |

*FIG. 6B.*

| SOURCE PORT | DESTINATION PORT |
|---|---|
| LENGTH | CHECKSUM |

*FIG. 6C.*

| DEVICE NAME | IP ADDRESS | SoIP SOCKET NUMBER |
|---|---|---|
| SERVER A | 100.100.100.1 | 000100 |
| RAID A | 100.100.100.2 | 000200 |
| TAPE LIBRARY A | 100.100.100.3 | 000300 |
| SERVER B | 100.100.101.1 | 000100 |
| RAID B | 100.100.101.2 | 000200 |
| TAPE LIBRARY B | 100.100.101.3 | 000300 |
| TAPE LIBRARY C | 100.100.102.1 | 000000 |

*FIG. 12B.*

| DEVICE NAME | IP ADDRESS | SoIP SOCKET NUMBER | LOCAL FIBRE CHANNEL ADDRESS |
|---|---|---|---|
| SERVER A | 100.100.100.1 | 000100 | 000100 |
| RAID A | 100.100.100.2 | 000200 | 000200 |
| TAPE LIBRARY A | 100.100.100.3 | 000300 | 000300 |
| SERVER B | 100.100.101.1 | 000100 | 000400 |
| RAID B | 100.100.101.2 | 000200 | 000500 |
| TAPE LIBRARY B | 100.100.101.3 | 000300 | 000600 |
| TAPE LIBRARY C | 100.100.102.1 | 000000 | 000700 |

*FIG. 12C.*

| DEVICE NAME | IP ADDRESS | SoIP SOCKET NUMBER | LOCAL FIBRE CHANNEL ADDRESS |
|---|---|---|---|
| SERVER A | 100.100.100.1 | 000100 | 000400 |
| RAID A | 100.100.100.2 | 000200 | 000500 |
| TAPE LIBRARY A | 100.100.100.3 | 000300 | 000600 |
| SERVER B | 100.100.101.1 | 000100 | 000100 |
| RAID B | 100.100.101.2 | 000200 | 000200 |
| TAPE LIBRARY B | 100.100.101.3 | 000300 | 000300 |
| TAPE LIBRARY C | 100.100.102.1 | 000000 | 009900 |

*FIG. 12D.*

METHOD AND APPARATUS FOR TRANSFERRING DATA BETWEEN IP NETWORK DEVICES AND SCSI AND FIBRE CHANNEL DEVICES OVER AN IP NETWORK

CROSS REFERENCES TO RELATED APPLICATIONS

This application is related to U.S. Provisional Patent Application Ser. No. 60/123,606, filed Mar. 10, 1999, entitled "METHOD AND APPARATUS FOR TRANSFERRING DATA BETWEEN IP NETWORK DEVICES AND SCSI AND FIBER CHANNEL DEVICES OVER AN IP NETWORK," the disclosure of which is hereby incorporated by reference in its entirety.

BACKGROUND OF THE INVENTION

The present invention relates to transferring information between storage devices and a network via a switched, packetized communications system. In particular, the present invention relates to methods and apparatus for receiving, translating, and routing data packets between SCSI (Small Computer Systems Interface), Fibre Channel and Ethernet devices in a flexible, programmable manner.

In enterprise computing environments, it is desirable and beneficial to have multiple servers able to directly access multiple storage devices to support high-bandwidth data transfers, system expansion, modularity, configuration flexibility and optimization of resources. In conventional computing environments, such access is typically provided via file system level Local Area Network (LAN) connections, which operate at a fraction of the speed of direct storage connections. As such, access to storage systems is highly susceptible to bottlenecks.

Storage Area Networks (SANs) have been proposed as one method of solving this storage access bottleneck problem. By applying the networking paradigm to storage devices, SANs enable increased connectivity and bandwidth, sharing of resources, and configuration flexibility. The current SAN paradigm assumes that the entire network is constructed using Fibre Channel switches. Therefore, most solutions involving SANs require implementation of separate networks: one to support the normal LAN and another to support the SAN. The installation of new equipment and technology, such as new equipment at the storage device level (Fibre Channel interfaces), the host/server level (Fibre Channel adapter cards) and the transport level (Fibre Channel hubs, switches and routers), into a mission-critical enterprise computing environment could be described as less than desirable for data center managers, as it involves replication of network infrastructure, new technologies (i.e., Fibre Channel), and new training for personnel. Most companies have already invested significant amounts of money constructing and maintaining their network (e.g., based on Ethernet and/or ATM). Construction of a second high-speed network based on a different technology is a significant impediment to the proliferation of SANs. Therefore, a need exists for a method and apparatus that can alleviate problems with access to storage devices by multiple hosts, while retaining current equipment and network infrastructures, and minimizing the need for new training for data center personnel.

In general, a majority of storage devices currently use "parallel" SCSI or Fibre Channel data transfer protocols whereas most LANs use an Ethernet protocol, such as Gigabit Ethernet. SCSI, Fibre Channel and Ethernet are protocols for data transfer, each of which uses a different individual format for data transfer. For example, SCSI commands were designed to be implemented over a parallel bus architecture and therefore are not packetized. Fibre Channel, like Ethernet, uses a serial interface with data transferred in packets. However, the physical interface and frame formats between Fibre Channel and Ethernet are not compatible. Gigabit Ethernet was designed to be compatible with existing Ethernet infrastructures and is therefore based on an Ethernet packet architecture. Because of these differences there is a need for new methods and apparatus to allow efficient communication between these protocols.

SUMMARY OF THE INVENTION

The present invention solves the above and other problems, thereby advancing the state of the useful arts, by providing methods and apparatus for transferring data between storage device interfaces and network interfaces. In particular, the present invention brings sophisticated SAN capabilities to existing enterprise computing configurations, without the installation of costly Fibre Channel switches and hubs, by providing the means for Internet Protocol (IP) devices to transparently communicate with SCSI and Fibre Channel devices over an IP network. The present invention accomplishes this through the use of Fibre Channel Protocol (FCP), an industry standard developed for implementation of SCSI commands over a Fibre Channel network. The invention allows the storage devices to retain the use of standard SCSI and Fibre Channel storage interfaces and construct a SAN using a company's existing network infrastructure. Therefore, no changes are required in host bus adapters (HBA) or storage devices (e.g. disk drives, tape drives, etc).

According to the present invention, methods and apparatus are provided for transferring data between IP devices (including, but not limited to, Gigabit Ethernet devices) and SCSI or Fibre Channel devices. The device interfaces may be either SCSI, Fibre Channel or IP interfaces such as Gigabit Ethernet. Data is switched between SCSI and IP, Fibre Channel and IP, or between SCSI and Fibre Channel. Data can also be switched from SCSI to SCSI, Fibre Channel to Fibre Channel and IP to IP. The port interfaces provide the conversion from the input frame format to an internal frame format, which can be routed within the apparatus. The apparatus may include any number of total ports. The amount of processing performed by each port interface is dependent on the interface type. The processing capabilities of the present invention permit rapid transfer of information packets between multiple interfaces at latency levels meeting the stringent requirements for storage protocols. The configuration control can be applied to each port on a switch and, in turn, each switch on the network, via an SNMP or Web-based interface, providing a flexible, programmable control for the apparatus.

According to one aspect of the present invention, a method is provided for routing data packets in a switch device in a network such as a SAN. The method typically comprises the steps of receiving a packet from a first network device at a first port interface of the switch device, wherein the packet is one of a SCSI formatted packet (i.e., SCSI formatted data stream converted into a packet), a Fibre Channel (FC) formatted packet and an Internet protocol (IP) formatted packet, wherein the first port interface is communicably coupled to the first network device, and converting the received packet into a packet having an internal format.

The method also typically includes the steps of routing the internal format packet to a second port interface of the switch device, reconverting the internal format packet to one of a SCSI formatted packet, an FC formatted packet or an IP formatted packet, and transmitting the reconverted packet to a second network device communicably coupled to the second port interface.

According to another aspect of the present invention, a network switch device is provided which typically comprises a first port interface including a means for receiving data packets from a network device, wherein the receiving means receives one of a SCSI formatted packet and a Fibre Channel (FC) formatted packet from a first network device, and a means for converting received packets into packets having an internal format, wherein the received data packet is converted into a first packet having the internal format. The switch device also typically comprises a second port interface including a means for reconverting packets from the internal format to an IP format, wherein the first packet is converted into a packet having an IP format, and a means for transmitting IP packets to a network, wherein the IP formatted packet is transmitted to an IP network. A means for routing the first packet to the second port interface is also provided.

According to yet another aspect of the present invention, a network switch device is provided which typically comprises a first port interface including a means for receiving data packets from an IP network, wherein the first interface means receives a packet in an IP format, and a means for converting received packets into packets having an internal format, wherein the received packet is converted into a first packet having an internal format. The switch device also typically comprises a second port interface including a means for reconverting packets having the internal format to packets having the SCSI format, and a means for transmitting reconverted packets to a SCSI network device. The switch device further typically includes a third port interface having a means for reconverting packets having the internal format to packets having the FC format, and a means for transmitting reconverted packets to a FC network device. A means for routing packets between the first, second and third port interfaces is also typically provided. In operation, wherein if the first packet is routed to the second port interface, the first packet is converted to the SCSI format and transmitted to the SCSI network device, and wherein if the first packet is routed to the third port interface, the first packet is converted to the FC format and transmitted to the FC network device.

According to a further aspect of the present invention, a network switch device is provided for use in a storage area network (SAN). The switch device typically comprises a first port interface communicably coupled to a SCSI device, wherein the first port interface converts SCSI formatted data packets received from the SCSI device into data packets having an internal format, and wherein the first port interface converts data packets having the internal format into SCSI formatted data packets. The switch device also typically comprises a second port interface communicably coupled to a FC device, wherein the second port interface converts FC formatted data packets received from the FC device into data packets having the internal format, and wherein the second port interface converts data packets having the internal format into FC formatted data packets. The switch device further typically includes a third port interface communicably coupled to a IP device, wherein the third port interface converts IP formatted data packets received from the IP device into data packets having the internal format, and wherein the third port interface converts data packets having the internal format into IP formatted data packets, and a switch fabric for routing data packets having the internal format between the first, second and third port interfaces. In typical operation, when a first one of the SCSI, FC and IP devices sends a first data packet to a second one of the SCSI, FC and IP devices, the port interface coupled to the first device converts the first data packet to a packet having the internal format and routes the internal format packet through the switch fabric to the port interface coupled to the second device, wherein the port interface coupled to the second device reconverts the internal format packet into the format associated with the second device and sends the reconverted packet to the second device.

According to yet a further aspect of the present invention, a network switch device for use in a storage area network (SAN) is provided. The switch may comprise any combination of Fibre Channel, SCSI, Ethernet and Infiniband ports, and may comprise any number of total ports. The switch device typically comprises a first port interface communicably coupled to one of a SCSI device(s), an FC device, or an IP device, a second port interface, wherein the second port interface is configurable to communicate with either a FC device or an Ethernet device, and a switch fabric for routing data packets having the internal format between the first and second port interfaces. In typical operation, when the second port interface is configured to communicate with a FC device, the second port interface converts FC formatted data packets received from the FC device into data packets having an internal format, and wherein the second port interface converts data packets having the internal format received from the switch fabric into FC formatted data packets, and wherein when the second port interface is configured to communicate with an Ethernet device, the second port interface converts Ethernet formatted data packets received from the Ethernet device into data packets having the internal format, and wherein the second port interface converts data packets having the internal format received from the switch fabric into Ethernet formatted data packets. The second port interface can be either self-configurable or user configurable.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIGS. 6a–c illustrate FCP packet encapsulation according to an embodiment of the present invention;

FIGS. 12a–d illustrate a network architecture and address tables for a Third Party Command example;

DESCRIPTION OF THE SPECIFIC EMBODIMENTS

Figure 1:
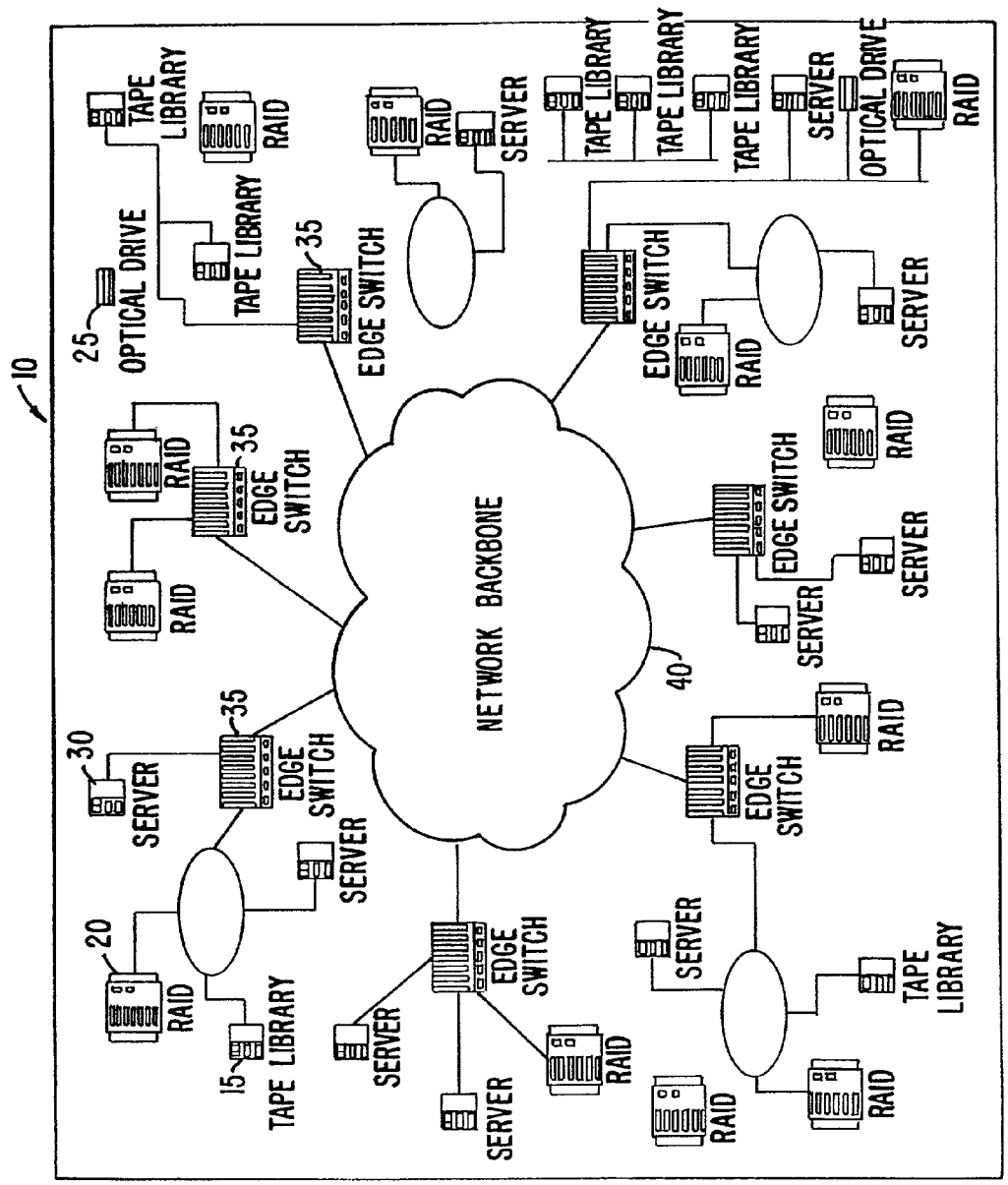
FIG. 1 illustrates an example of a SAN constructed according to the present invention.

FIG. 1 illustrates an example of a storage area network (SAN) 10 according to an embodiment of the present invention. As shown, network 10 includes numerous storage devices, such as tape libraries 15, RAID drives 20 and optical drives 25 (e.g., CD, DVD, etc.) and servers 30. The storage devices can be either storage targets (e.g., tape libraries 15, RAID drives 20, etc.) or initiators (e.g., servers 30). Note that a device could be both an initiator and a target. In a preferred embodiment, the invention is implemented in a switching device 35 within network 10. For example, as shown in FIG. 1, each switching device 35 is an "edge" switch which provides the connectivity between nodes (i.e., one or more storage devices) and a network 40. In other words, the switch resides on the "edge" of the network where the devices are located. Each edge switch 35 allows connected storage elements to communicate through the edge switch with no traffic being sent to network 40. Each edge switch 35 also allows storage elements connected to different edge switches to communicate with each other through network 40. In a preferred embodiment, network 40 is an Ethernet network, but other networks may be used, for example, Asynchronous Transfer Mode (ATM)-based or FDDI-based networks, or the like.

Figure 2:
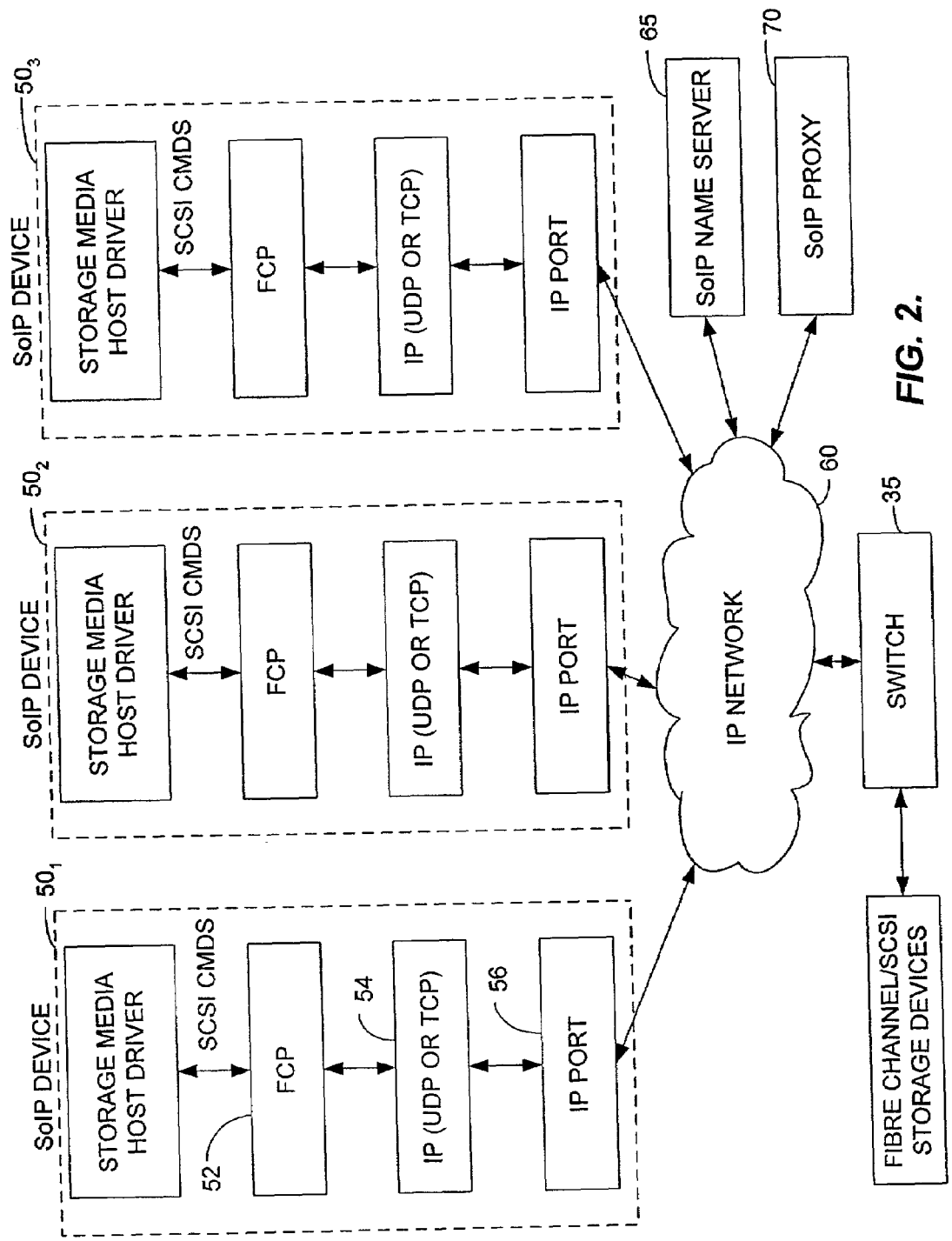
FIG. 2 is a block diagram of an overview of the Storage over Internet Protocol (SoIP) implementation.

In one embodiment, a switching device 35 is implemented in an SoIP (Storage over Internet Protocol) storage area network (SAN) as shown in FIG. 2. According to the present invention, SoIP is a framework for transporting SCSI commands and data over IP networks using the Fibre Channel Protocol for SCSI (FCP) for communication between IP networked storage devices. A majority of storage devices currently communicate using either a "parallel" SCSI bus or a Fibre Channel serial interface. FCP is an FC-4 Upper Layer Protocol for sending SCSI commands and data over a Fibre Channel network yielding a "serial" SCSI network. The SoIP framework enables FCP for use on an IP network by defining the SoIP protocol. Storage devices and host bus adapters operating the SoIP protocol form a storage area network (SAN) directly on an IP network. This framework offers an enormous advantage in the installation and utility of SANs.

As shown in FIG. 2, each SoIP device 50 converts SCSI commands and data into FCP data frames in FCP block 52. The SoIP protocol layer block 54 then encapsulates these FCP frames in multiple IP packets using either the User Datagram Protocol (UDP) or Transport Control Protocol (TCP). IP port 56 forwards the packet to IP network 60, which routes the IP packets between the devices 50 or to switch 35. IP network 60 is preferably an Ethernet network, but may be based on any IP-compatible media including ATM, FDDI, SONET and the like. The storage name server 65 serves as a database where devices store their own information and retrieve information on other devices in the SoIP network. The SoIP proxy 70 performs protocol conversion between SoIP based on UDP and SoIP based on TCP.

Because the majority of storage devices currently use "parallel" SCSI or Fibre Channel protocols, the transition to SoIP-based SANs may be hampered unless such "legacy" devices can be connected to an SoIP network. For these "legacy" devices, a switch as shown in FIG. 3 is provided for connection into an SoIP SAN.

Figure 3:
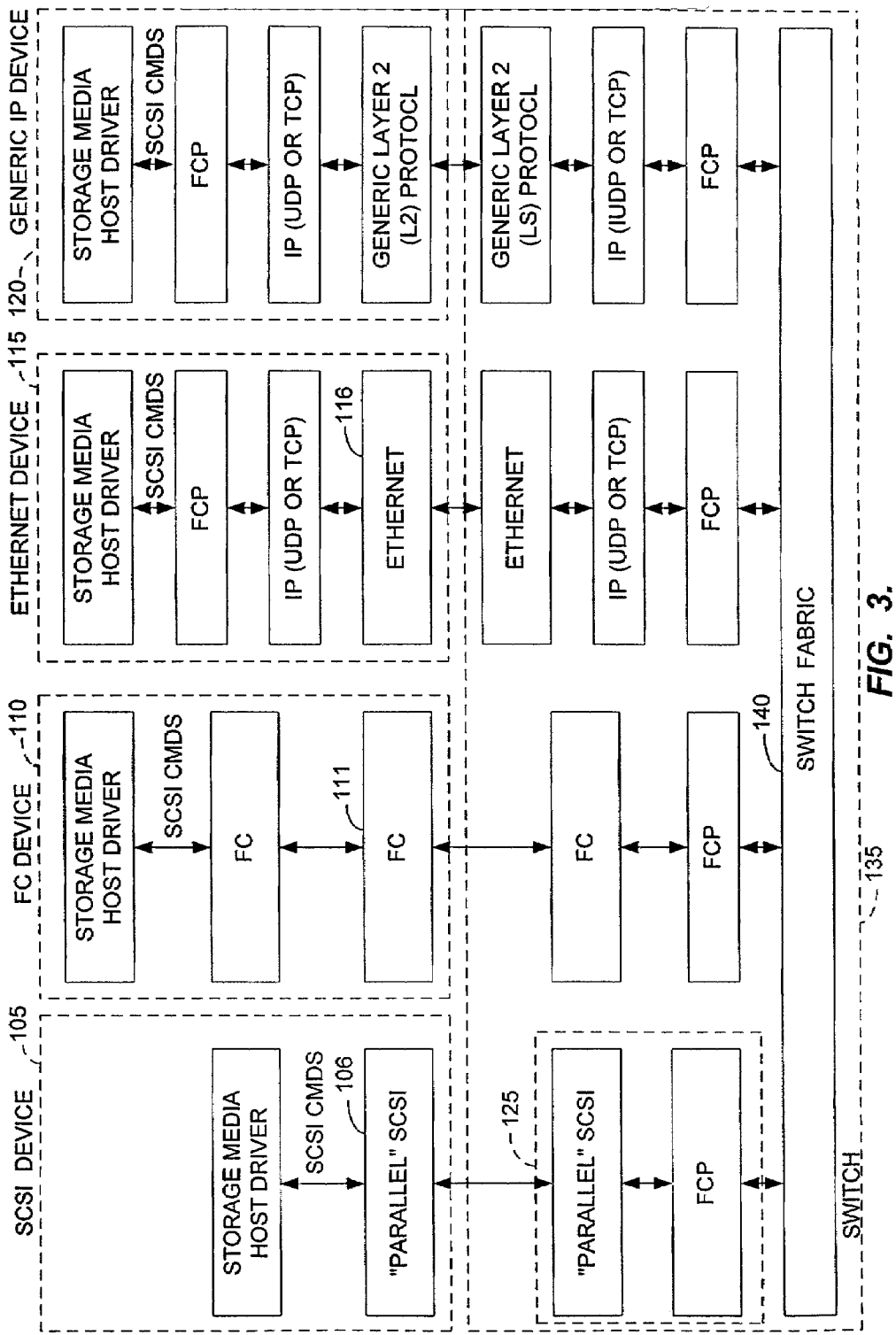
FIG. 3 illustrates the required protocol conversion steps between Fibre Channel, SCSI and IP devices in the apparatus switch fabric according to an embodiment of the present invention.

FIG. 3 illustrates data exchange between storage devices using a switch 135 according to an embodiment of the present invention. In this embodiment, switch 135 is configured to receive data from different interfaces, each of which has a different data or frame format. SCSI device 105 transmits data using a "parallel" SCSI interface 106, Fibre Channel (FC) device 110 transmits data using Fibre Channel interface 111 and Ethernet device 115 transmits data using Ethernet interface 116. Switch 135 translates data received from a source port in one of the three different formats into an internal format and transfers the data in the internal format through switch fabric 140 to a destination port. The destination port translates the data back into the native format appropriate for the connection thereto.

In this embodiment, each device, e.g., SCSI device 105, FC device 110, Ethernet device 115, or generic IP device 120 (e.g., disk drive, tape drive, server), performs storage operations based on the SCSI Command Set. For Fibre Channel device 110, the SCSI commands and data are converted to FCP and transmitted using Fibre Channel interface 111. For SCSI device 105 the SCSI commands and data are transferred directly using a "parallel" bus 106. In this embodiment, the SCSI port interface 125 of switch 135 acts like a SCSI to FC bridge so that the SCSI port looks like an FC port from the point of view of switch fabric 140. As shown, the SCSI data is preferably converted to FCP, and is not actually transmitted using a Fibre Channel interface. For Ethernet device 115, SCSI commands and data are converted to FCP and then encapsulated in an IP packet using UDP or TCP. The IP packet is then encapsulated in an Ethernet frame and transmitted using Ethernet interface 116. Note that the term "SCSI device" implies a device with a "parallel SCSI bus" while the term "Fibre Channel device" implies a device with a Fibre Channel interface. Both devices operate as SCSI devices at the command level. Note that SCSI device 105 does not convert the SCSI commands and data to an FCP format. Therefore, it is not possible to transfer data between FC device 110 and SCSI device 105 directly. As shown in FIG. 3, it is possible for all devices connected to switch 135 to exchange data frames because the data format of all interfaces into switch fabric 140 are FCP compatible frames. Also note that it is possible to replace Fibre Channel with another interface. For example, FIG. 3 shows a storage device constructed using Ethernet in the same manner as a device is constructed with FC. Ethernet simply replaced Fibre Channel as the media for transport. Infiniband may also be implemented, for example in generic IP device 120. As is well known, Infiniband is an I/O interface that merges the work of NGIO (Next Generation I/O) and Future I/O.

Figure 4:
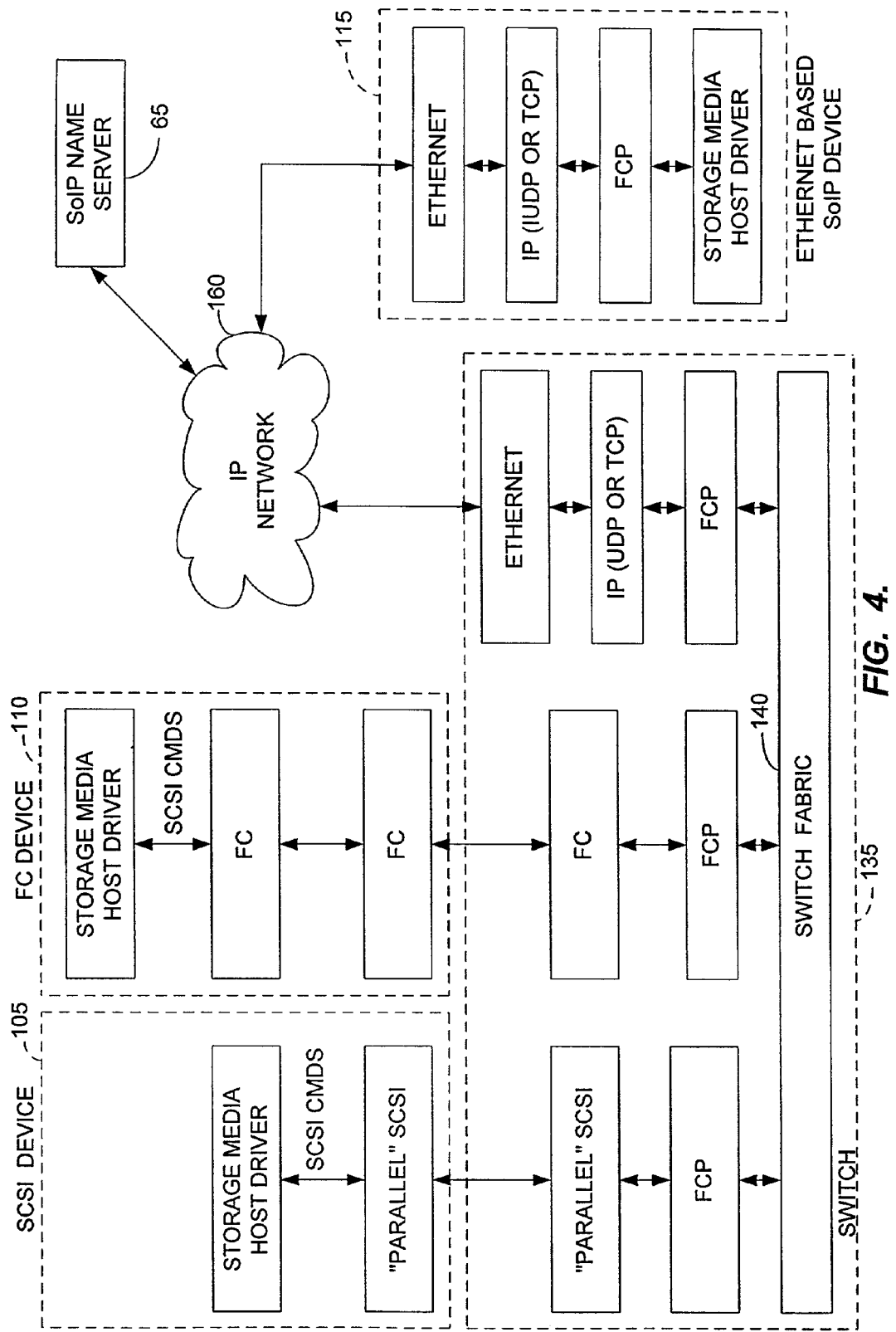
FIG. 4 is an overview of the legacy storage protocol conversion method by which the functionality of the invention is achieved.

FIG. 4 illustrates data exchange between Fibre Channel, SCSI and IP devices in switch apparatus 135 according to an embodiment of the present invention. The example in FIG. 4 is for an Ethernet based IP network 160, however any other IP networks based on other protocols such as ATM, FDDI, etc. may be used. Similar to the embodiment in FIG. 3, FIG. 4 shows the protocol translations which occur for each device. SCSI device 105 communicates with switch 135 using SCSI commands directly with no encapsulation of data or commands in data frames. FC device 110 uses the FCP protocol to send SCSI commands and data to switch 135. Switch 135 converts the received data to a common protocol based on FCP to allow the devices to communicate with each other. In addition, switch 135 performs address translation between the Fibre Channel and SCSI addressing schemes to the IP addressing method as will be discussed in more detail below. This is done transparently so that no changes are required in Fibre Channel device 110 or SCSI device 105, or in any host bus adapters, driver software or application software.

Figure 5:
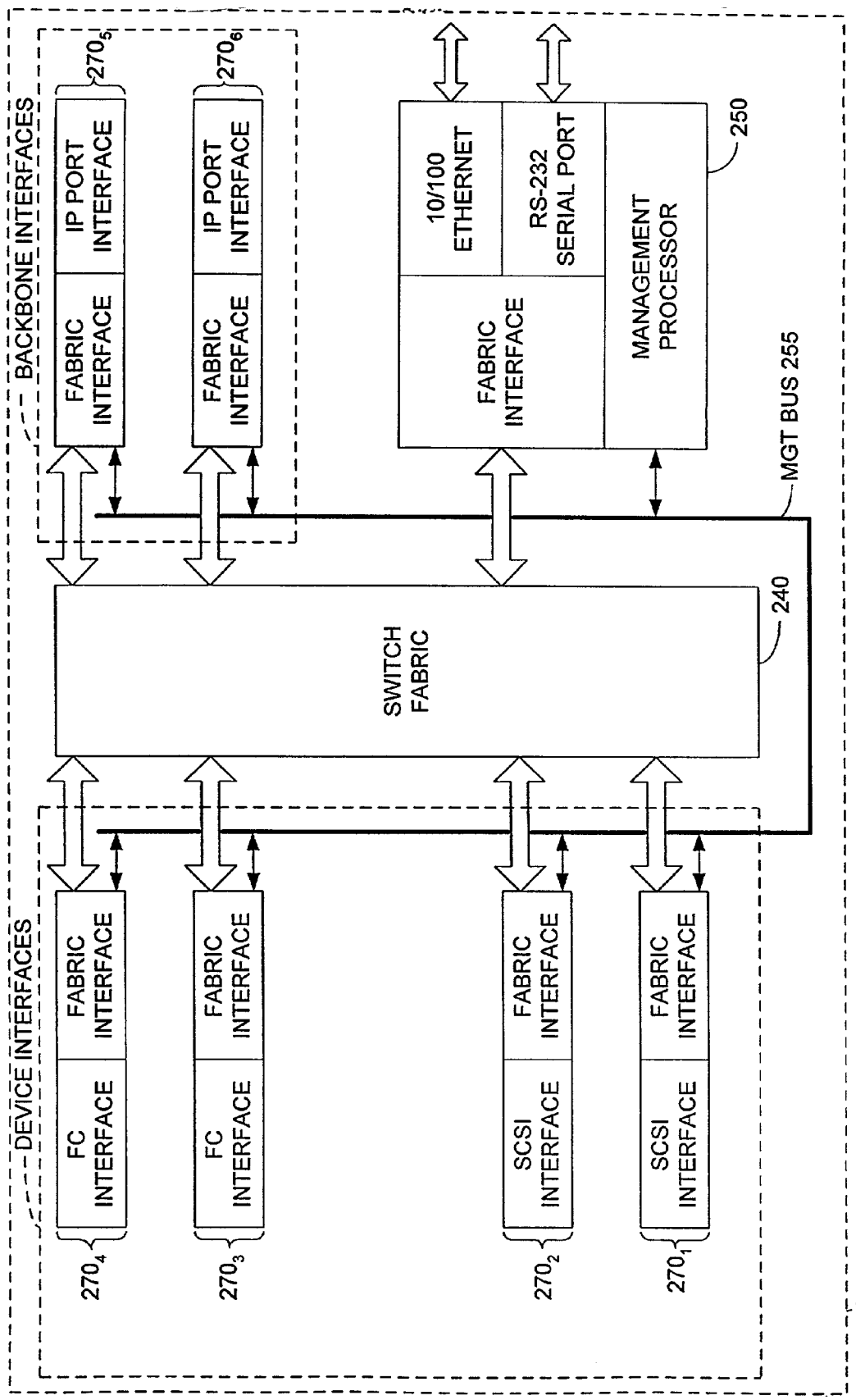
FIG. 5 is a high level switch diagram outlining the basic architecture of the physical apparatus according to an embodiment of the present invention.

FIG. 5 is a high-level switch diagram outlining the basic architecture of a physical switch apparatus 235 according to an embodiment of the present invention. In this embodiment, switch 235 includes three main elements: switch fabric 240, management processor 250 and port interfaces 270. Switch fabric 240 provides a high bandwidth mechanism for transferring data between the various port interfaces 270 as well as between port interfaces 270 and management processor 250. Management processor 250 performs management related functions for switch 235 (e.g. switch initialization, configuration, SNMP, Fibre Channel services, etc.) primarily through management bus 255.

Port interfaces 270 convert data packets from the input frame format (e.g., parallel SCSI, FC, or Ethernet) to an internal frame format. The internal frame format data packets are then routed within switch fabric 240 to the appropriate destination port interface. Port interfaces 270 also determine how packets are routed within the switch. The amount of processing performed by each port interface 270 is dependent on the interface type. SCSI ports $270_1$ and $270_2$ provide the most processing because the SCSI interface is half-duplex and it is not frame oriented. The SCSI port interfaces $270_1$ and $270_2$ also emulate the functionality of a SCSI host and/or target. Fibre Channel ports $270_3$ and $270_4$ require the least amount of processing because the internal frame format is most compatible with Fibre Channel. In essence, IP ports $270_5$ and $270_6$ (e.g., Ethernet ports) and SCSI ports $270_1$ and $270_2$ convert data received into an internal frame format before sending the packets through switch fabric 240.

Figure 6A:
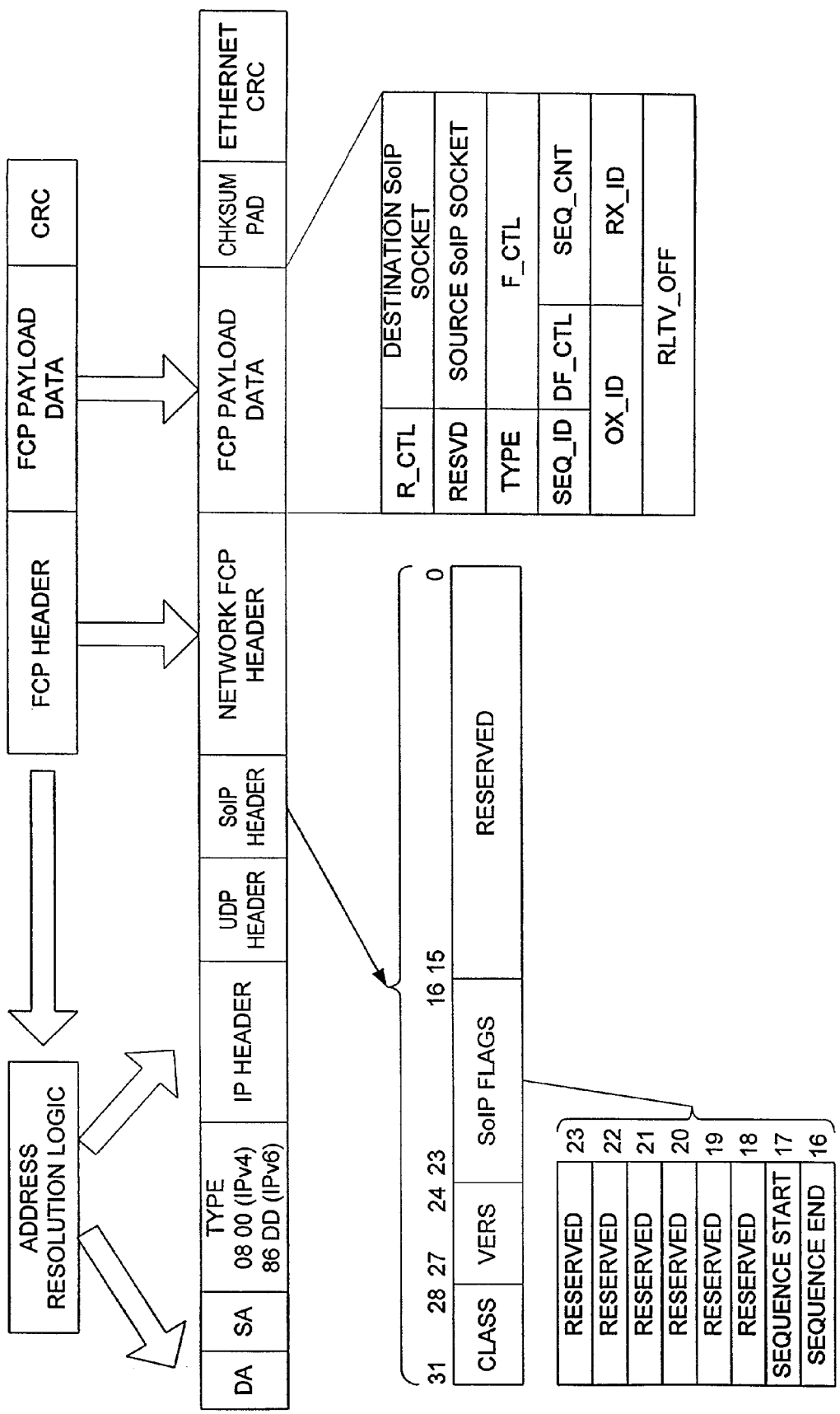
Figure 7:
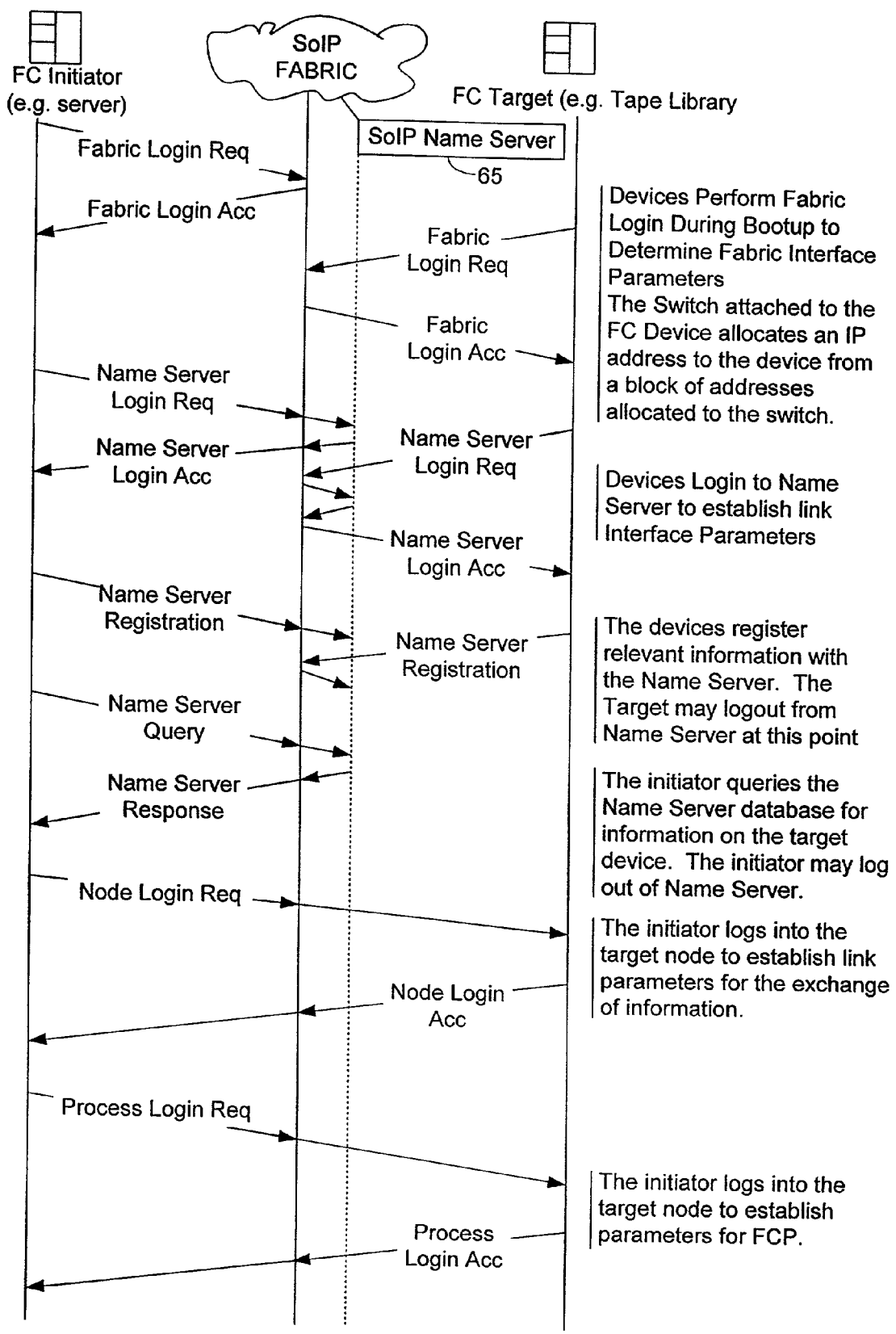
FIG. 7 shows the frame flow for the "session" initialization for Fibre Channel devices connected to an SoIP network.
Figure 8:
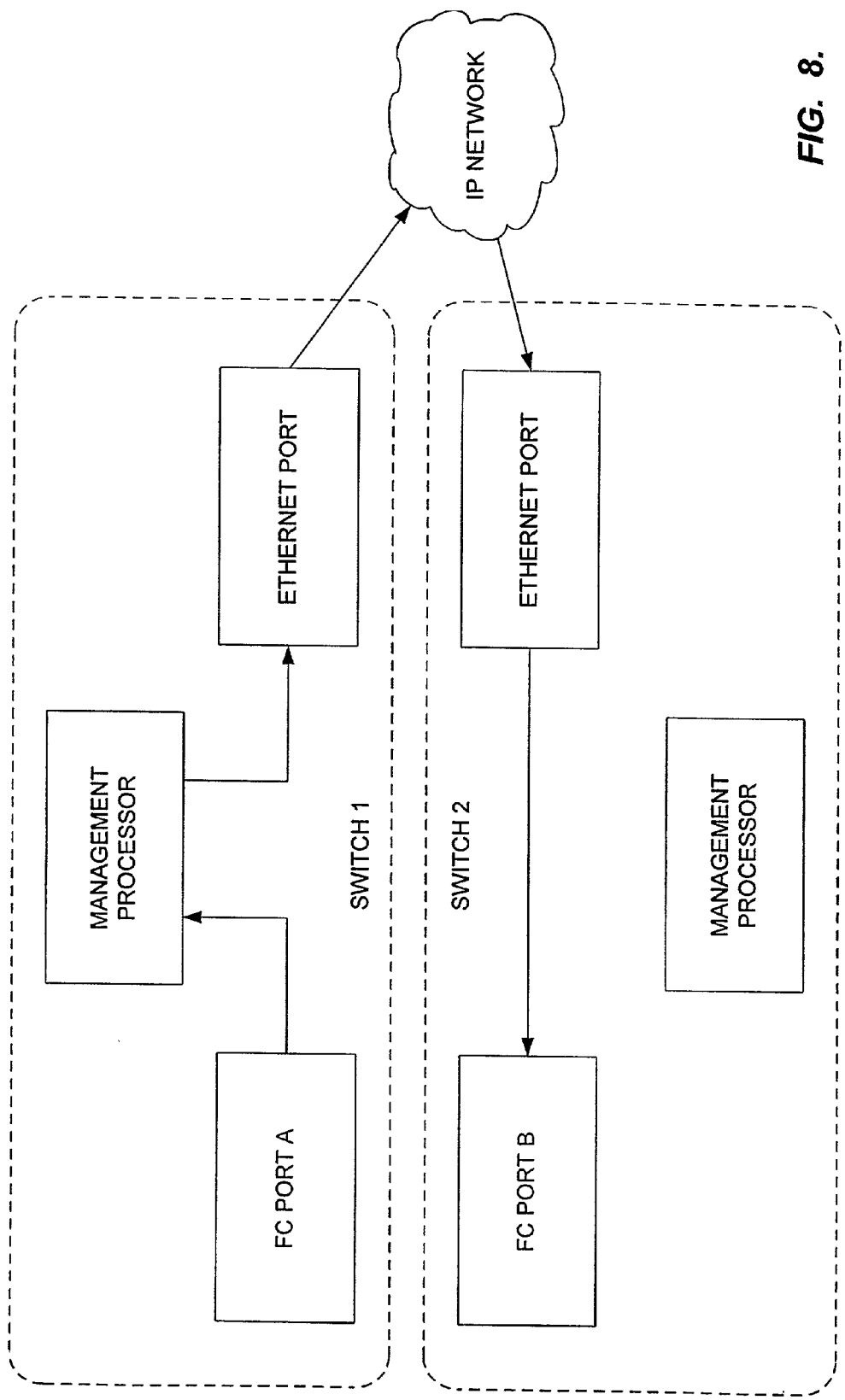
FIGS. 8 and 9 show the flow of data frames for a node login initiated by FC port A of switch 1 to FC Port B of switch 2 located remotely according to an embodiment of the present invention.
Figure 9:
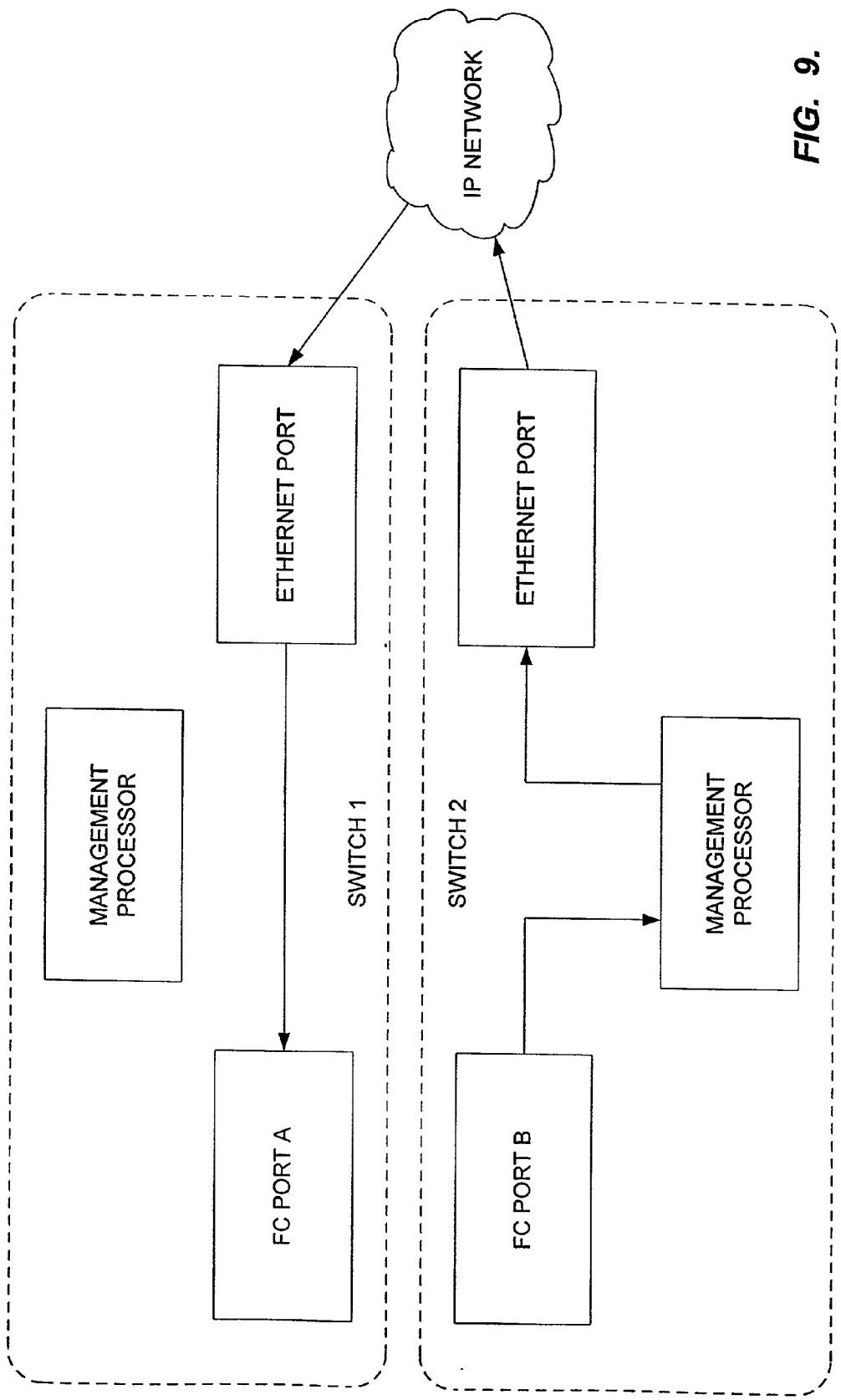

Because FCP frames are not directly compatible with an Ethernet interface as they are with a Fibre Channel interface, the transmission of FCP packets on an Ethernet interface requires that an FCP frame be encapsulated in an Ethernet frame as shown in FIG. 6a.

FIG. 6a illustrates FCP packet encapsulation in an IP frame carried over an Ethernet frame according to an embodiment of the present invention. Field Definitions for FIG. 6a include the following:

DA: Ethernet Destination Address (6 bytes).
SA: Ethernet Source Address (6 Bytes).
TYPE: The Ethernet packet type.
CHECKSUM PAD: An optional 2-byte field which may be used to guarantee that the UDP checksum is correct even when a data frame begins transmission before all of the contents are known. The CHECKSUM PAD bit in the SoIP Header indicates if this field is present.
ETHERNET CRC: Cyclic Redundancy Check (4 bytes).
As shown in FIG. 6a, the SoIP Header field contain the following parameters:
CLASS: This 4-bit field indicates the class of service. In one embodiment, only the values 2 or 3 are used.
VERS: This 4-bit field indicates the protocol version of SoIP.
SoIP FLAGS: This 8-bit field contains bits that indicate various parameters for a data frame as shown in FIG. 6b.
In FIG. 6a, the User Datagram Protocol (UDP) Header is the protocol used within the IP packet. TCP may also be used. The UDP header, defined in RFC 768, is 8 bytes in length consisting of four 16-bit fields as shown in FIG. 6c, with the following field definitions:
SOURCE PORT: An optional field. When meaningful, it indicates the port of the sending process, and may be assumed to be the port to which a reply should be addressed in the absence of other information. If not used, a value of zero is inserted.
DESTINATION PORT: has a meaning within the context of a particular internet destination address.
LENGTH: the length, in bytes, of the user datagram including the UDP header and data (thus, if there were no data in the datagram, the length would be 8). For an encapsulated FCP packet, the UDP Length is the sum of the UDP Header Length, FCP Header length, and FCP Payload length and optionally the checksum pad.
CHECKSUM: the 16-bit one's complement of the one's complement sum of a pseudo header of information from the IP header, the UDP header, and the data, padded with bytes of zero at the end (if necessary) to make a multiple of 2 bytes.

In one embodiment, a switch 235 encapsulates FC packets into an Ethernet Frame with a "wrapper" around the FC information. The encapsulation of an FCP data frame in an Ethernet packet may require that the FCP data frame be limited in size because the maximum FCP data frame size is 2136 bytes (24 byte header+2112 byte payload) whereas an Ethernet packet has a maximum size of 1518 bytes. The use of Ethernet Jumbo Frames, which permit packet sizes up to 9 Kbytes to be used, eliminates the need to limit the Fibre Channel frame size. However, support for Ethernet jumbo frames is limited within the existing network infrastructure. Therefore, FCP data frames need to be limited otherwise a large FCP data frame may need to be "fragmented" into 2 separate Ethernet frames. The Login procedures defined in the Fibre Channel standard allows devices to negotiate the maximum payload with the switch fabric 240. Thus, the switch fabric 240 can respond to a login with a smaller payload size than the maximum (e.g., 1024 bytes). Switch 235 makes use of this fact to limit FC packets to a size which can be encapsulated in an Ethernet packet to eliminate the need for fragmenting FC packets. According to one embodiment, a node's maximum receive data field size is provided to switch fabric 240 during "Fabric Login" and to each destination node during "Port Login." The fabric or node being "logged into" generates a login response which indicates the maximum receive data field size for data frames it is capable of receiving. Note that these values may not be the same. For example, a fabric may have the maximum allowed size of 2112 bytes while a node may limit the maximum size to 1024 bytes (e.g. the Hewlett-Packard Tachyon-Lite Fibre Channel Controller). A source node may not transmit a data frame larger than the maximum frame size as determined for the login response.

Since an encapsulated FCP data frame cannot be larger than the maximum Ethernet packet size, an upper limit is placed on the frame payload size during login by a device. According to one embodiment, the upper limit value is set by determining or discovering the maximum IP datagram size and subtracting 60 bytes to account for the various headers and trailers. For example, for an Ethernet Frame, the upper limit value equals 1440 bytes. That is, the payload for an FCP Frame cannot exceed 1440 bytes in size. This limit is established because an FCP Frame being transported across an IP network will not be allowed to fragment. Allowing IP datagrams to fragment degrades network performance and so most networks rarely fragment. An IP header's Do Not Fragment Flag can be used to prevent the IP layer from fragmenting the datagram. Even with node login setting an appropriate size for the FCP payload, this bit is set to ensure that fragmentation does not occur. According to one embodiment, the payload is padded to a multiple of 4 bytes to make it easy to convert frames being sent to legacy FC devices.

Each switch 235 preferably makes use of the Buffer to Buffer Receive Data Field size to force end nodes to communicate with data frames that will fit within an IP packet carried over an Ethernet link. According to an embodiment of the present invention, one method for enforcing the maximum frame size is to intercept Node Login packet which can be transmitted across an Ethernet network without being fragmented. Therefore, each Management Processor may need to perform MTU (Maximum Transmission Unit) discovery to determine a size which does not result in fragmentation of IP packets in the network.

Figure 10:
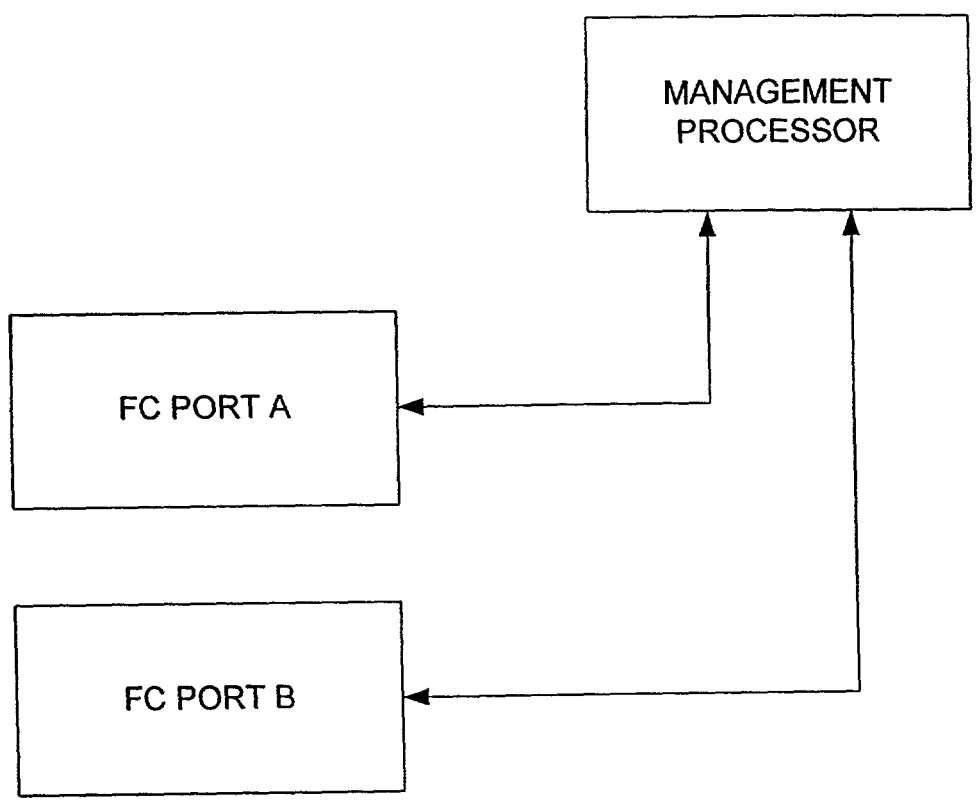
FIG. 10 shows the routing of Port Login Request and Response frames for local FC ports according to an embodiment of the present invention.

When an FC port performs a Port Login with an FC port which is local (i.e. connected to the same switch), it is not necessary to change the Buffer to Buffer Receive Data Field Size of the Login request or response. This is because, in one embodiment, the switch supports the maximum frame size for transfers between FC ports (on the same switch). However, the FC port interface logic will always redirect the Port Login packets to the switch's Management Processor to simplify the port interface logic. Thus, in this embodiment, the switch looks and acts like an FC switch from the point of view of any FC devices connected thereto. An example of the routing of Port Login Request and Response frames for local FC ports is shown in FIG. 10.

According to one embodiment, routing FC Port Login Request/Response packets to the Management Processor allows the Port Login for SCSI ports to be handled by the Management Processor. The Management Processor always handles login for SCSI.

According to one embodiment, an SoIP device is uniquely identified using two parameters: an IP address and an SoIP socket number. Therefore, it is possible for a device to have a unique IP address or for multiple devices to share an IP address. For example, all of the devices on a Fibre Channel arbitrated loop may share an IP address while a server Host Bus Adapter may have a dedicated IP address. In one embodiment, there are two possible modes for assignment of the SoIP socket number: local or global.

A single SoIP device connected directly to an IP network must have a unique IP address in order for the network to be able to route data frames to the device. An IP network will not route traffic based on the SoIP socket number. However, devices connected to a switch (e.g., switch 235) may share an IP address if the switch uses both the IP address and the SoIP socket number when switching data frames.

Figure 11:
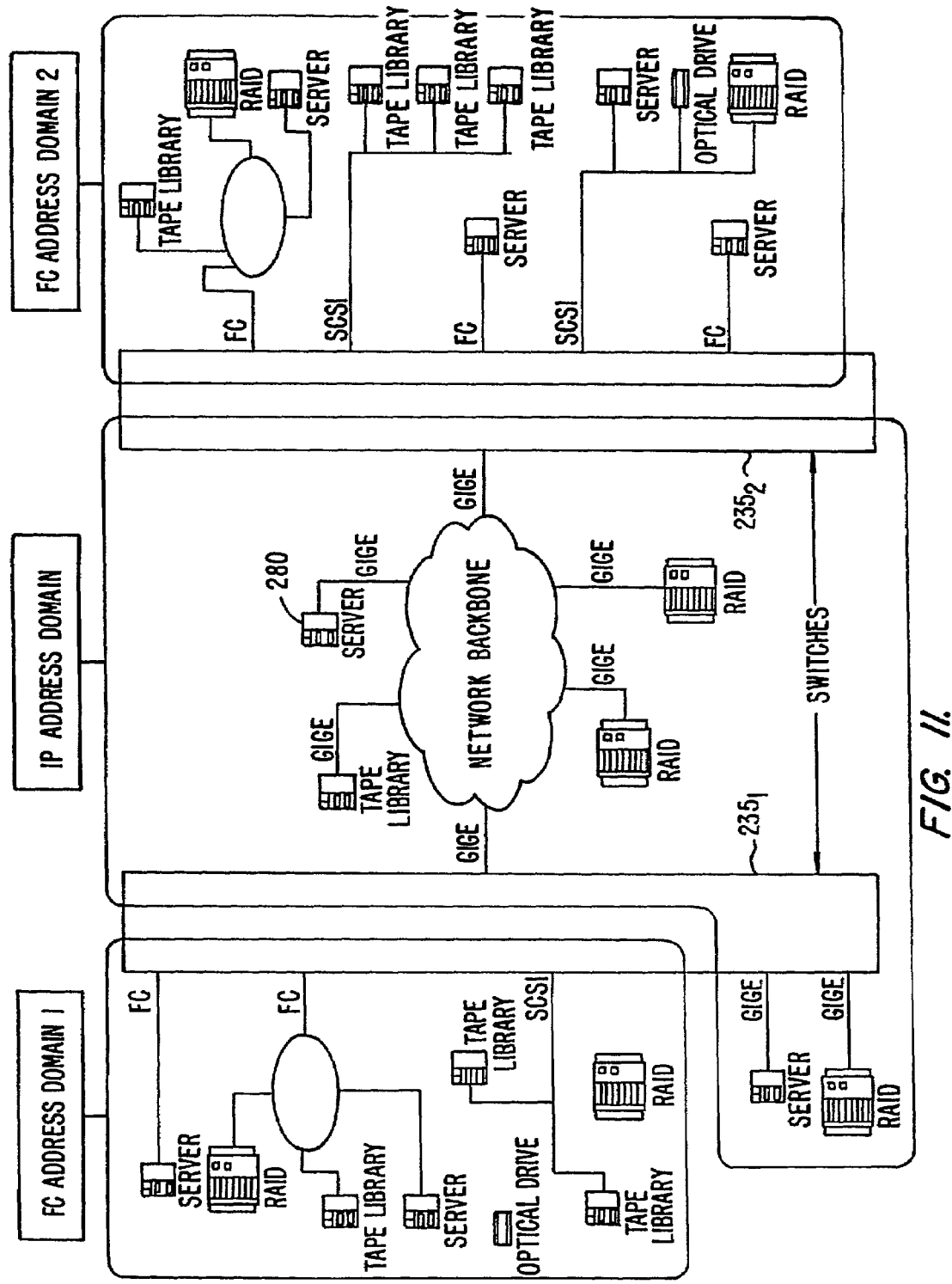
FIG. 11 shows an example of the address domains which exist in a network according to one embodiment of the present invention.

According to the present invention, an SoIP network SAN with "legacy" Fibre Channel devices attached has different address domains due to the two different address methods used: IP and Fibre Channel. FIG. 11 shows an example of the address domains which exist in a network according to one embodiment of the present invention. SoIP devices communicate using IP addresses and the SoIP socket numbers while the Fibre Channel devices (SCSI devices are treated as Fibre Channel devices by a switch) use Fibre Channel addresses. Each switch 235 performs address translation between the IP and Fibre Channel address domains. Switch $235_1$ performs address translation between the IP address domain and FC address domain 1, and Switch $235_2$ performs address translation between the IP address domain and FC address domain 2. Each switch 235 assigns an IP address, SoIP socket number and Fibre Channel address to each Fibre Channel device when the device performs a fabric login. A Fibre Channel device only learns about its assigned Fibre Channel address. The assigned IP address, SoIP socket number and Fibre Channel Address are maintained within a translation table (not shown) in the switch. Parallel SCSI devices are assigned their addresses by the switch during initialization of the SCSI port. The Fibre Channel ports direct all Name server requests by a Fibre Channel device to the management processor for processing.

According to one embodiment of the present invention, the management processor converts Fibre Channel Name Server requests into SoIP Name Server requests that are then forwarded to the SoIP Name Server, e.g., implemented in server 280. In one embodiment, the SoIP name server functionality is distributed and thus handled directly by the management processor. Responses from the name server are returned to the management processor where they are converted into Fibre Channel Name Server responses before being forwarded to the port that originated the name server request. When a Fibre Channel device sends data frames to a device not located in its Fibre Channel address domain, switch 235 converts the packet into an SoIP compatible packet. The conversion encapsulates the FCP data frame in an IP data frame as described above. Referring back to FIG. 6*a*, in one embodiment, the IP addresses and SoIP socket numbers are derived by using the Fibre Channel source address (S_ID) and the destination address (D_ID) as "keys" into the IP/Fibre Channel address conversion table on the name server. The Fibre Channel address fields are replaced by the SoIP socket numbers when translating a Fibre Channel data frame to an SoIP data frame. The packet is then transmitted on the IP network and routed using the destination IP address. If the destination device is an SoIP compatible device, the packet is processed directly (i.e., de-encapsulated and processed as an FCP packet) by the destination device. However, if the destination is a Fibre Channel (or parallel SCSI) device, the packet is routed to a switch 235, which receives the packet, de-encapsulates the SoIP packet and replaces the SoIP socket numbers with the appropriate source and destination Fibre Channel addresses based on the source and destination IP addresses and SoIP socket numbers.

According to one embodiment, local assignment is the preferred method for assigning SoIP socket numbers. In this embodiment, native SoIP devices select their SoIP socket numbers while an SoIP switch (e.g., switch 235) assigns the SoIP socket number for Fibre Channel and SCSI devices attached to the switch. When the SoIP socket number is assigned locally, the value chosen may be any value that results in a unique IP Address/SoIP socket number combination. Devices that share an IP address must be assigned unique SoIP socket numbers in order to create a unique IP Address/SoIP socket number pair. Devices that have a unique IP address may have any desired SoIP socket number. In one embodiment, an SoIP switch assigns the SoIP socket numbers in such a manner as to simplify the routing of received data frames. A switch must also assign a locally significant Fibre Channel address to each "remote" device for use by the local devices in addressing the "remote" devices. These locally assigned addresses are only known by a switch within its Fibre Channel address domain. Thus each switch maintains a set of locally assigned Fibre Channel addresses which correspond to the globally known IP Address/SoIP Port Number pairs defined in the SoIP Name Server.

According to one embodiment, due to the different address domains, each switch 235 intercepts Fibre Channel Extended Link Service requests and responses which have Fibre Channel address information embedded in the payload. Extended Link Service requests and responses are generated infrequently. Therefore, it is acceptable to redirect the Extended Link Service requests to the switch's management processor which makes any necessary changes to the data frame. If an Extended Link Service request/response has no addressing information embedded in the payload, the Management Processor simply retransmits the packet with no modifications.

The IP Address and SoIP socket number assigned to a Fibre Channel or SCSI device are determined by the switch. The assignment of these addresses is implementation dependent. In a preferred embodiment, the SoIP socket number is assigned the device's local Fibre Channel address. In this embodiment, the switch obtains the local Fibre Channel address directly from the received data frame. Alternatively, assignment of the SoIP socket number is based on an incrementing number that can be used as an index into an address table.

In one embodiment, each device is assigned a unique IP address. However, this type of assignment may result in the use of a large number of IP addresses. The use of a single IP address for each device also has implications for routing in the IP network. Therefore, in a preferred embodiment, IP addresses are assigned such that at least a subset of a switch's attached devices share an IP address. For example, an IP address can be assigned to each switch port. Each device attached to that switch port then shares the port's IP address. Thus, an attached Fibre Channel N_Port would have a unique IP address while the devices on a Fibre Channel arbitrated loop attached thereto would share an IP address.

According to one embodiment, Fibre Channel addresses are assigned globally. Globally assigned Fibre Channel addresses provide the maximum compatibility for "legacy" Fibre Channel devices. In this embodiment, the SoIP name server is responsible for managing the allocation of Global Fibre Channel Addresses. A global Fibre Channel address space may need to be supported because in some cases Fibre Channel addresses may be embedded within "third-party" SCSI commands. An example of such a third-party command is COPY. The COPY command instructs another device to copy data. The use of "third-party" commands is rare but when used, either the command would need to be modified for address compatibility or the Fibre Channel addresses would need to be globally assigned.

Figure 12A:
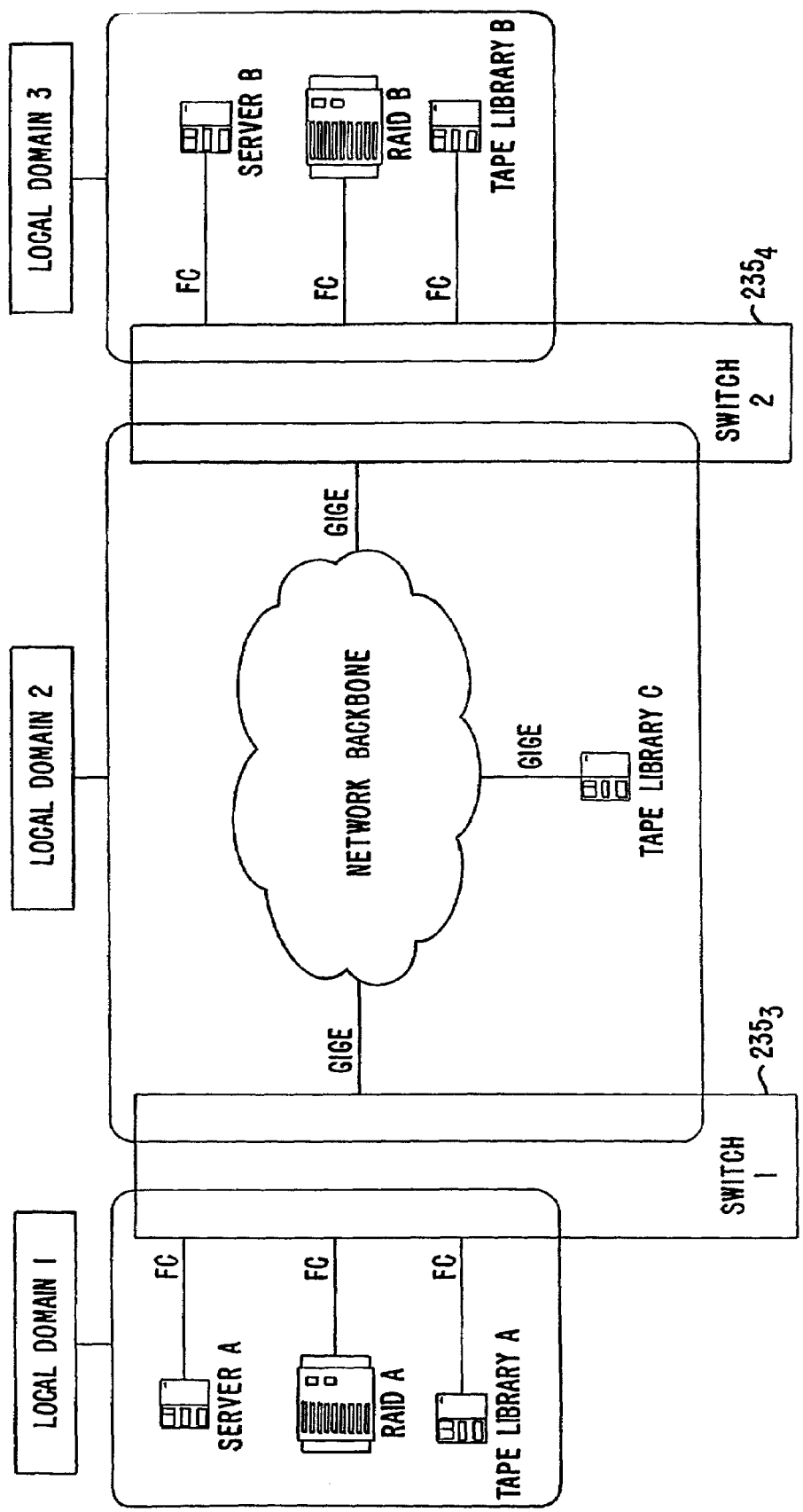

With reference to the SoIP network shown in FIG. 12a, an example third party COPY command will be used to illustrate a problem that occurs with locally assigned Fibre Channel addresses and third-party commands. In this example locally assigned Fibre Channel Addresses are also used as the SoIP socket number. Each device has a unique IP address in this example.

FIG. 12b shows the IP Address and SoIP socket number each device has advertised to the Name Server which identifies how the device is addressed within the SoIP network. Each device is uniquely identified by the combination of IP Address and SoIP socket number. Assume that the switches $235_3$ and $235_4$ and Tape Library C are aware of every device in the system. Tape Library C would then have an address table that is the same as the name server's address table. Switches $235_3$ and $235_4$ will have assigned local Fibre Channel addresses to each device. FIG. 12c illustrates the address table stored on switch $235_3$ and FIG. 12d illustrates the address table stored on switch $235_4$. Because the Fibre Channel addresses are assigned locally, the address assignment is purely arbitrary.

Assume that Server A in local domain 1 sends a COPY command to Server B in local domain 3 indicating that data is to be copied from RAID drive B to Tape Library B, both of which are located in local domain 3. The COPY command will contain the addresses from Server A's perspective. Therefore, referring to FIG. 12c, the command received by Server B is COPY from Fibre Channel device 000500 (RAID drive B) to Fibre Channel device 000600 (Tape Library B). However, Server B will interpret the COPY command using the address table of switch $235_4$ (FIG. 12d) and assume it should copy data from RAID drive A to Tape Library A and not RAID drive B to Tape Library B. Thus, the wrong operation will be performed. As another example, assume that Server B sends a command to Server A to copy from RAID drive A to Tape Library C. The command will be COPY from Fibre Channel address 000500 to 009900 (the addresses are from the perspective of switch $235_4$). Server A will assume the command is to copy data from RAID drive B to a nonexistent device because 009900 is not in the address table of switch $235_4$.

According to one embodiment, the switch gets around this problem by intercepting each third party command and modifying the embedded Fibre Channel addresses to be compatible with the destination device. However, this requires that the source switch know the assignment of local addresses in the destination switch. While it is possible for a switch to convert the third-party commands, alternative methods are preferred.

According to one alternative method, Fibre Channel addresses are globally assigned for devices that are referenced by Fibre Channel address in third-party commands. The use of a Global Fibre Channel address allows third-party commands to be used with no modification, but sets the total number of devices possible in an SoIP network to the same maximum as a Fibre Channel network. Only those devices that are referenced in a third-party command require a global address, although all devices within an SoIP network can be assigned global addresses.

A Globally Assigned Fibre Channel address is preferably used as the device's SoIP socket number. This simplifies the conversion of "legacy" Fibre Channel data frames to SoIP compatible data frames. Therefore, globally assigning Fibre Channel addresses is equivalent to globally assigning SoIP socket numbers.

Global SoIP socket number allocation is managed by the SoIP Name Server, which allocates Global SoIP socket numbers as requested from a pool of free socket numbers, and deallocates socket numbers (returns them to the free pool) when they are no longer used. The assignment of Global SoIP socket numbers for all devices in an SoIP network is the simplest solution from a management standpoint because it does not require specifying the subset of devices that require a Global SoIP socket number (or alternatively, the devices that can use a local SoIP socket number).

Thus, all devices in an SoIP network either have a locally assigned SoIP socket number or a globally assigned SoIP socket number. All SoIP compatible devices and switches support both modes. Each device or switch determines from the SoIP Name Server which mode is to be supported when it logs into the network. An SoIP Name Server configuration parameter indicates the SoIP socket number allocation mode.

An environment that supports both local and global SoIP socket numbers is not required because it is expected that the need for global SoIP socket numbers will be eliminated due to a new form of Third-Party command format, which embeds World Wide Names in the command instead of the Fibre Channel address. Because World Wide Names are unique, the device receiving the command is able to determine the appropriate address(es) to use from its point of view. One implementation of this new third-party command is the EXTENDED COPY command. Native SoIP devices preferably use the version of third-party commands that embed World Wide Names in the command when SoIP socket numbers are locally assigned.

In one embodiment, when SoIP socket numbers are assigned globally, the requester indicates the minimum number of socket numbers requested and a 24-bit mask defining the boundary. For example, a 16-port switch may request 4096 socket numbers with a bit mask of FFF000 (hex) indicating that the socket numbers should be allocated on a boundary where the lower 12 bits are 0. The switch would then allocate 256 socket numbers to each port (for support of an arbitrated loop). Allocation of socket numbers on a specified boundary allows the switch to allocate socket numbers that directly correlate to port numbers. In the above example, bits 11:8 would identify the port. Native SoIP devices preferably allocate only one global SoIP socket number from the SoIP Name Server.

In one embodiment, the SoIP Name Server also includes a configuration parameter that selects "Maximum Fibre Channel Compatibility" mode which only has meaning for Global assignment of SoIP socket numbers. Devices are able to query the Name server for the value of this parameter. When enabled, this mode specifies that global SoIP socket numbers are to be allocated in blocks of 65536 (on boundaries of 65536) to switches. This mode is compatible with the existing Fibre Channel modes of address allocation where the lower 8 bits identify the device, the middle 8 bits identify the port and the upper 8 bits identify the switch. SoIP switches check for this mode and, if enabled, request 65536 socket numbers when requesting global SoIP socket numbers. In this mode, Native SoIP devices preferably allocate only one global SoIP socket number from the SoIP Name Server.

Figure 13:
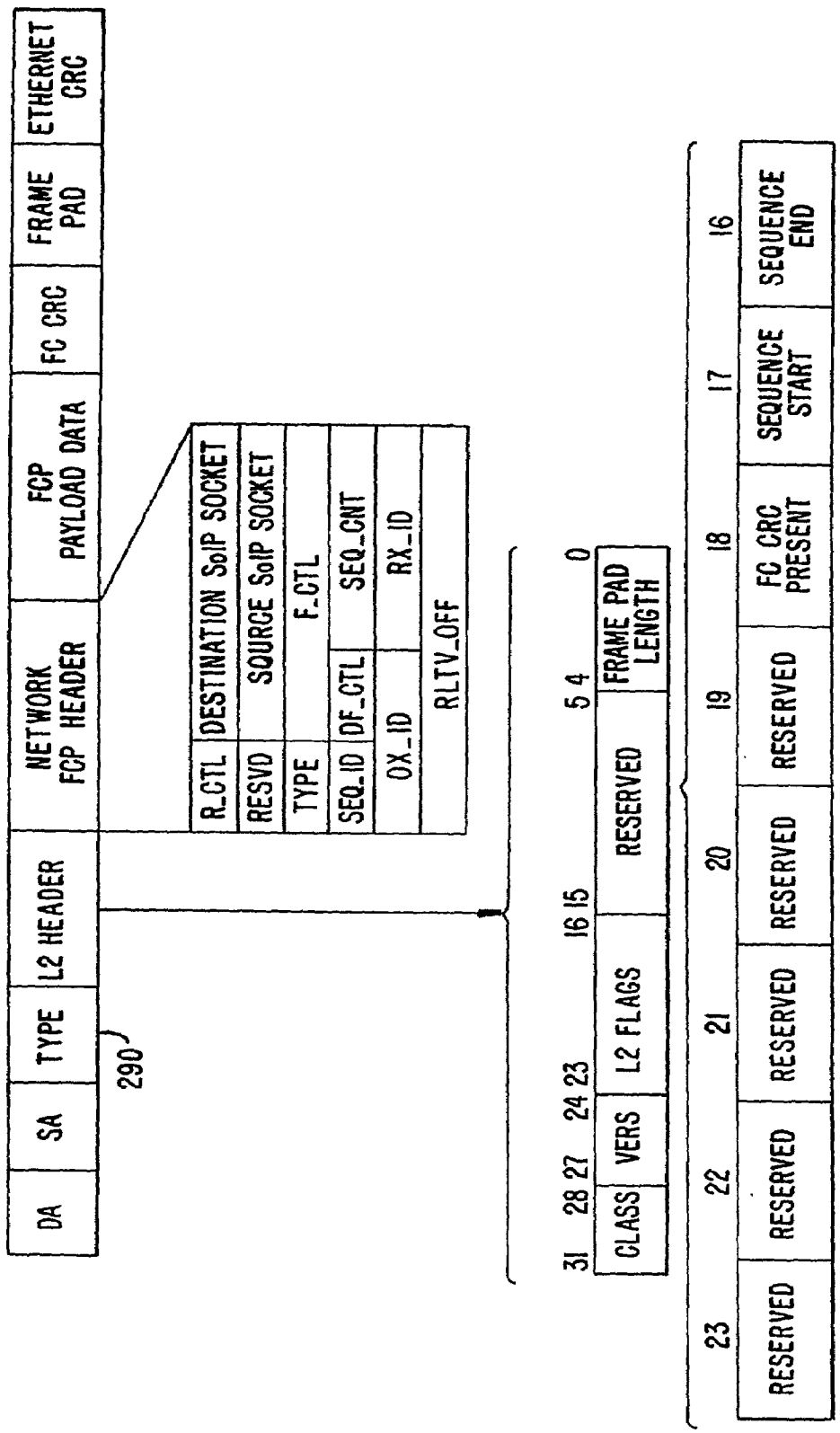
FIG. 13 illustrates layer 2 FCP packet encapsulation according to an embodiment of the present invention.

According to one embodiment, when operating in a Layer 2 network (e.g., no IP routers), the frame format is modified to simplify the encapsulation logic. A Layer 2 network does not require the IP Header or the UDP header. All frames are forwarded using the physical address (e.g. Ethernet MAC address). A switch then routes frames internally based on the Layer 2 physical address (e.g. Ethernet MAC address) combined with the SoIP socket number. In essence, the Layer 2 physical address replaces the IP address as a parameter in uniquely identifying an SoIP device. FIG. 13 shows the frame format for an FCP frame transmitted on Ethernet. An Ethernet Type value 290 is defined specifically for SoIP to allow a station receiving the frame to distinguish the frame from other frame types (e.g., IP). The IP and UDP headers have been removed which reduces the frame overhead. An advantage is that the length and checksum fields in the UDP header no longer need to be generated. The generation of the IP and UDP headers introduces additional latency for the frame transmission because the length and checksum are located at the beginning of the frame. Therefore, it is necessary to buffer the entire frame to determine the length and checksum and write them into the header. For an Ethernet Layer 2 SoIP frame, it is only necessary to determine the amount of padding, if any, added at the end of the frame. The number of PAD bytes must be included in the SoIP Header to allow the PAD bytes to be removed at the receiving station. Since the padding is only required to satisfy a minimum Ethernet frame size of 64 bytes, it is possible to complete the header generation after 64 bytes of the frame (or the entire frame) have been received.

The Layer 2 frame format is similar to the Layer 3 frame format SoIP Frame conversion described above with reference to FIG. 6 with the following differences:

a. The IP and UDP headers are no longer present.
b. The Ethernet Type value is different.
c. The CHEKSUM PAD field is replaced by the FC CRC field. The FC CRC field is a 4-byte field containing the Fibre Channel CRC calculated over the FCP header and payload. This field may be inserted by a source when a Fibre Channel data frame is encapsulated with no changes. Thus, the CRC received with the frame is still valid.
d. The CHECKSUM PAD flag is replaced by the FC CRC PRESENT flag. This bit indicates if the FC CRC field is present in the frame. Note that the CHECKSUM PAD field has no meaning since there is no need to calculate a UDP checksum.
e. The FRAME PAD LENGTH may have a non-zero value since the encapsulated frame length may be less than the Ethernet minimum of 64.

Figure 14A:
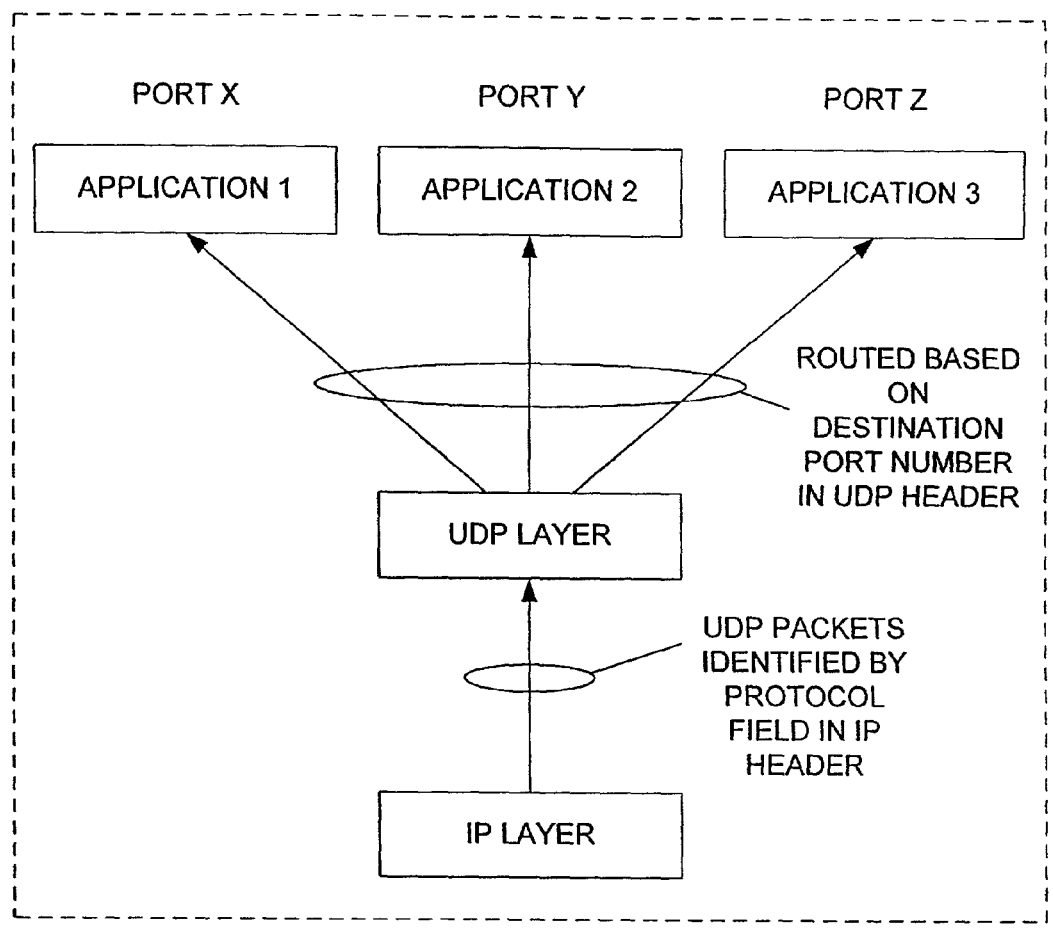
FIGS. 14a–c illustrate examples of UDP Frame demultiplexing according to embodiments of the present invention.

The UDP Header contains a Destination Port field and a Source Port field. The normal usage of these fields is to identify the software applications that are communicating with each other. An application requests a port number for use when sending a UDP "datagram". This port number becomes the source port number for each UDP datagram sent by the application. When a UDP datagram is received, the destination port number is used by the UDP layer to determine the application to which the datagram will be forwarded. FIG. 14a illustrates "demultiplexing" of UDP datagrams as is typical in the industry.

Figure 14B:
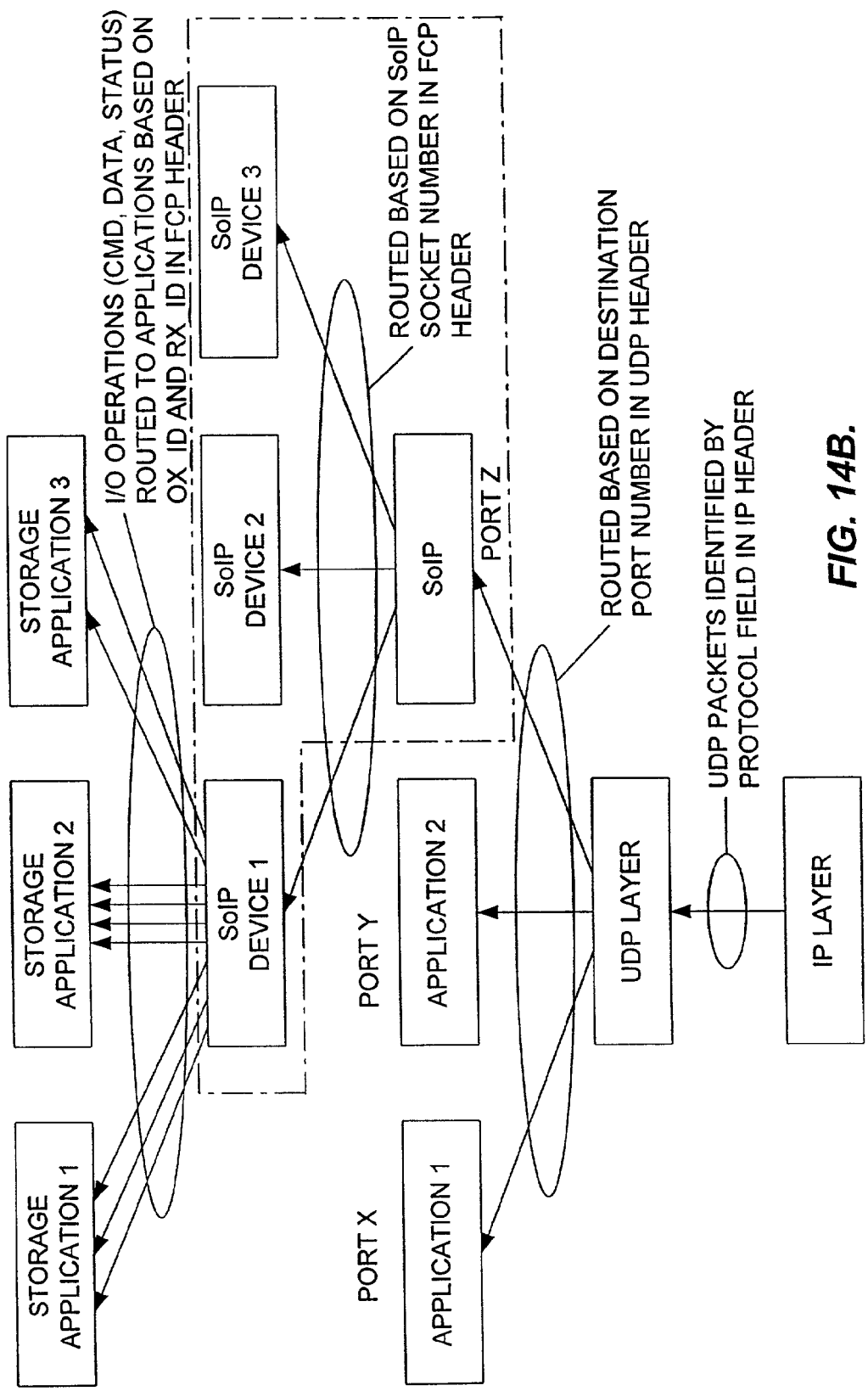
Figure 14C:
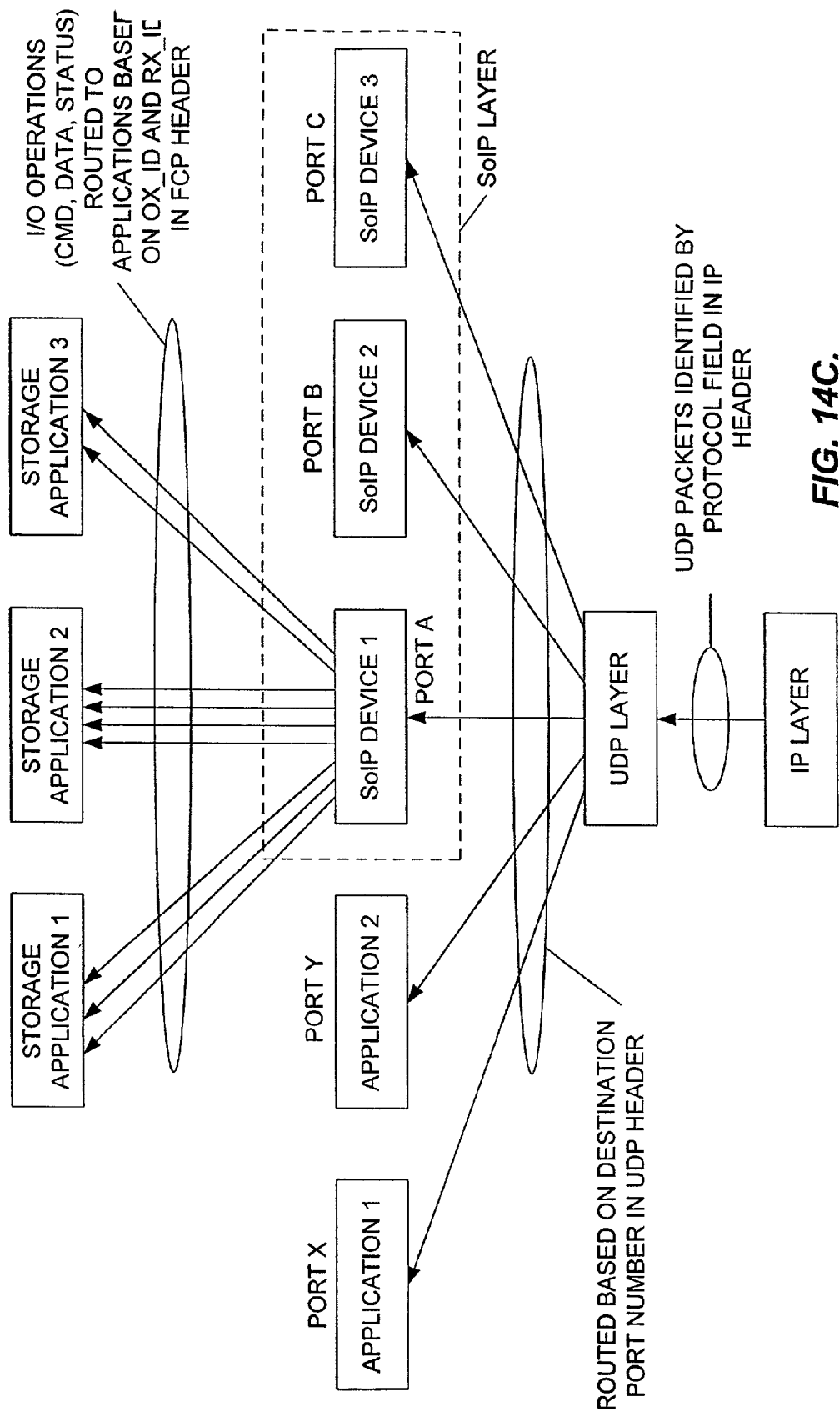

FIGS. 14b and 14c illustrate ways to add an SoIP layer according to embodiments of the present invention. FIG. 14b illustrates frame demultiplexing when there is a single port number assigned to all SoIP devices. Further demultiplexing is then performed using the SoIP socket number to determine the device. Routing data frames to applications is then performed based on the FCP exchange numbers located in the FCP header. FIG. 14c illustrates a similar example, but with separate UDP port numbers assigned to each SoIP device. In this case, it is not necessary to examine the SoIP socket number in order to forward the UDP datagram. (The SoIP socket number and IP address must still uniquely identify the device). The choice of whether to use a single UDP port number for each SoIP device or one UDP port number for all devices is implementation dependent.

The UDP demultiplexing examples illustrated in FIGS. 14b and 14c are oriented toward a server with one or more host bus adapters (where the host bus adapters are the SoIP devices). A switch is generally less complicated in the sense that data frames are forwarded to end devices and the application layer does not have to be handled.

The addressing mechanisms described above allow software applications to appear as SoIP devices by registering with the name server using a different address. This opens up the possibility for applications to advertise themselves in the name server for use by other applications. An example is a COPY manager that could be used by a higher level backup application.

According to one embodiment, each storage device, when it registers with the name server, must include the UDP port number to use when sending data frames to the device. In a normal UDP application, the destination port would save the source port number for use in sending a reply. However, this mechanism is not feasible for use with "legacy" FC switches since it requires the switch to associate the source port numbers with the exchange ID's. It is much simpler to require a storage device to always use the same UDP port number.

As a result, according to this embodiment, a storage device is identified by 3 parameters in the name server database: IP Address, UDP Port Number, and SoIP socket number. An additional parameter required is the physical address (e.g. Ethernet MAC address) which is determined in the normal manner for IP networks. ARP (address resolution protocol) is preferably used to learn the physical address to use for an IP address. The physical address to use can also be learned when a frame is received from a device. For example, the physical address can be learned when a Port Login request is received. The physical address may not be the physical address of the actual device but the address of an IP router.

The SoIP Name Server (SNS) must have a UDP Port number that is known by all of the SoIP devices within an SoIP network since the port number cannot be learned from another source. This could be a "well-known" port number or a registered port number. This approach is similar to a Domain Name Server (DNS) that has a well-known port number of 53. The assignment of "well-known" port numbers is done by the IANA (Internet Assigned Numbers Authority).

Routing within an IP network is affected by the choice of addressing mode which impacts the ability of switches and routers to determine what constitutes a "conversation". A conversation is a set of data frames that are related and which should arrive in order. However, it is assumed that conversations have no ordering relationship. In other words, the ordering of frames from different conversations can be changed with no effect. For example, assume that frames for 3 conversations (A, B and C) are transmitted in the following order (A1 sent first):

A1 A2 B1 B2 B3 A3 B4 A4 A5 A6 A7 B5 B6 B7 C1 C/2 C3 A8.

It is permissible for the frames to be received in any of the following sequences (note that there are many more possible sequences that are acceptable):

```
A1 A2 A3 A4 A5 A6 A7 A8 B1 B2 B3 B4 B5 B6 B7 C1 C2
C3;

A1 A2 A3 A4 A5 A6 C1 C2 B1 B2 B3 B4 B5 B6 B7 C3 A7
A8; and

C1 C2 A1 C3 A2 B1 B2 A3 A4 A5 A6 B3 B4 B5 A7 A8 B6
B7.
```

In each of the above sequences, the frames for a particular conversation arrive in order with respect to each other, but out of order with respect to frames from other conversations. The ability to identify different conversations allows load balancing to be performed by allowing traffic to be routed on a conversation basis. Switches and routers can determine conversations based on several parameters within a data frame including Destination/Source addresses, IP Protocol, UDP/TCP Port Numbers, etc. The parameters actually used are dependent on the switch/router implementation.

Storage traffic between the same two devices should be treated as a single conversation. It is not acceptable for storage commands to be received out of order because there may be a relationship between the commands (e.g. ordered queuing). Therefore, it is preferable to select an addressing mechanism that makes a device unique to a switch/router but does not attempt to distinguish commands. Different IP addresses are an ideal choice for distinguishing devices since this method works with all switches and routers. When an IP address is shared, it is preferred that the UDP Port Numbers be unique for the devices sharing the IP address. Thus, devices that share an IP address have the possibility to be treated separately by switches and routers that classify conversations based on UDP port numbers. It is understood that the discussion of UDP Port Numbers above also applies to TCP Header Port Numbers when SoIP is implemented using TCP instead of UDP.

Figure 15:
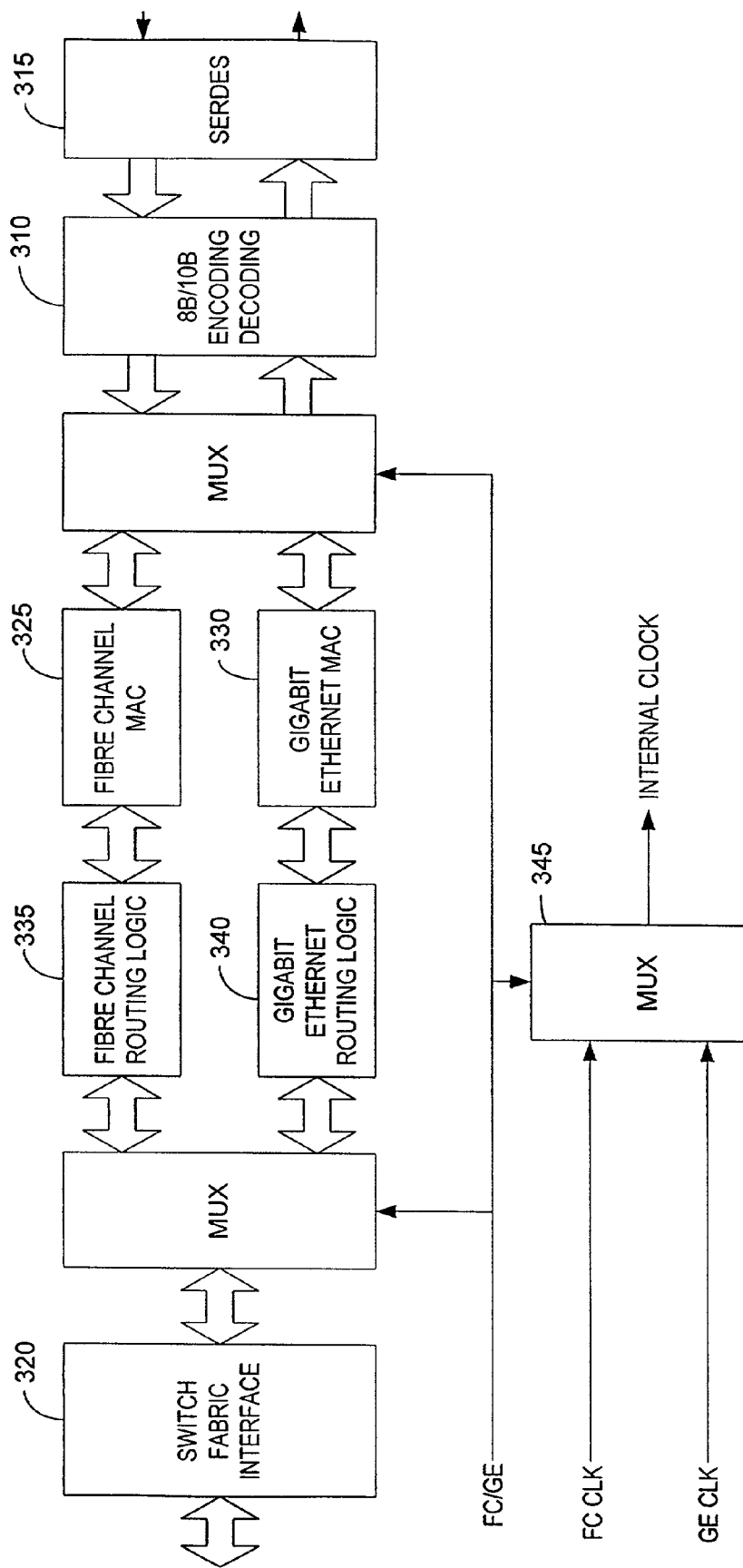
FIG. 15 is a high level block diagram which illustrates the basic architecture for a switch port that supports both Fibre Channel and Ethernet according to an embodiment of the present invention.

FIG. 15 is a high level block diagram which illustrates the basic architecture for a switch port that supports both Fibre Channel and Gigabit Ethernet according to an embodiment of the present invention. The Fibre Channel and Gigabit Ethernet ports use the same encoding/decoding method (8B/10B) with each port requiring a serializer/deserializer (SERDES) block for converting to/from the high speed serial interface. Therefore, these two interfaces share the 8B/10B block 310 and SERDES block 315 in this embodiment as shown in FIG. 15. These two interface types differ in clock speed with Fibre Channel operating at 1062.5 MHz and Gigabit Ethernet operating at 1250 MHz. Higher speed versions of these interfaces are being developed which will also have a different clock speed. Therefore, a multiplexer 345 selects the clock used by the logic based on the port type. In addition, these two interfaces share the switch fabric interface logic block 320 which interfaces with the switch fabric (including the management interface). The MAC blocks (blocks 325 and 330) implement the appropriate protocol state machines for the interface (Fibre Channel or Gigabit Ethernet). The MAC blocks 325 and 330 convert received data into frames which are forwarded to the routing logic blocks 335 and 340, respectively. The MAC blocks 325 and 330 also receive data frames from the routing logic blocks 335 and 340, respectively, which are then transmitted according to the interface's (Fibre Channel or Gigabit Ethernet) protocol. Routing logic blocks 335 and 340 determine where each received frame should be routed based on addressing information within the frame. Routing logic blocks 335 and 340 also perform any modifications to the frames that are required. For example, a routing logic block will remove the SoIP encapsulation from a frame being forwarded to a Fibre Channel port. The routing logic block then sends the frame to the switch fabric with an indication of the destination output ports. Egress data frames (frames from the switch fabric to the output port) are received by a routing logic block and forwarded to the associated MAC. Additional processing may be performed on the frame by the routing logic block before the MAC receives the frame. For example, Ethernet port routing logic block 340 may convert a Fibre Channel frame into an SoIP frame.

Figure 16:
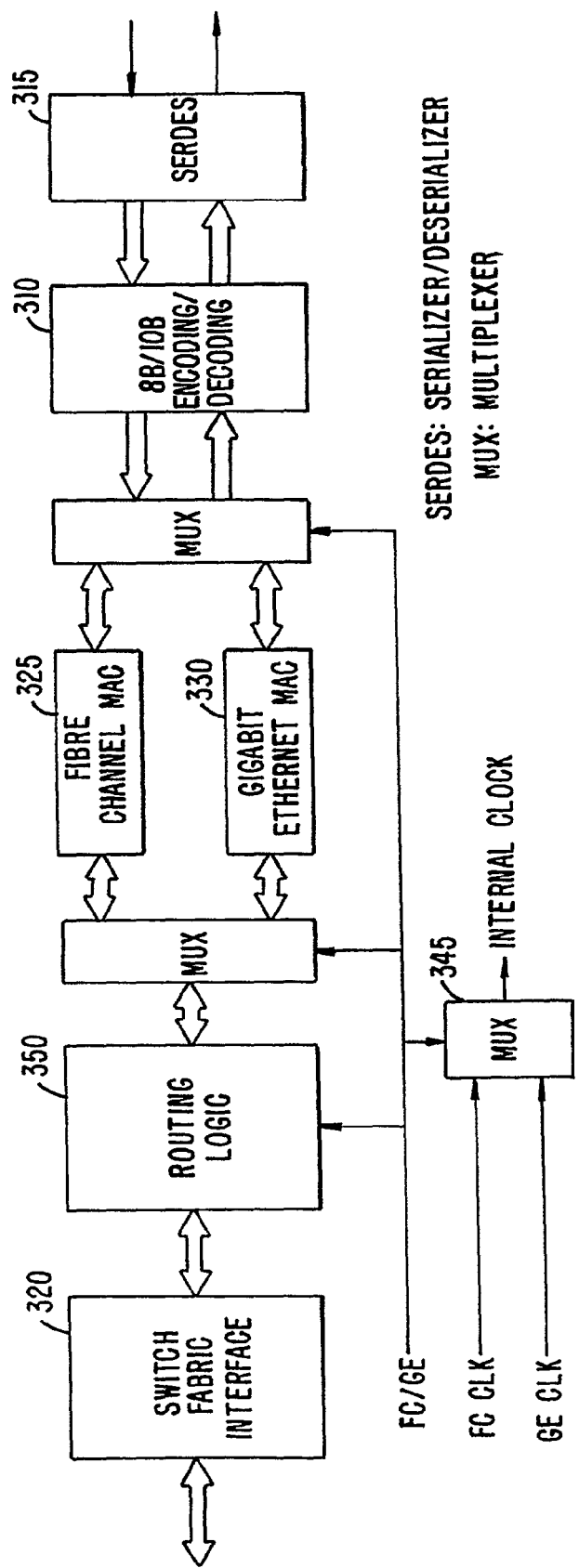
FIG. 16 is a high level block diagram which illustrates the basic architecture for a switch port that supports both Fibre Channel and Ethernet, where two routing blocks are combined into a single block according to an embodiment of the present invention.

According to another embodiment of the present invention as shown in FIG. 16, the two routing blocks of FIG. 15 are combined into a single routing logic block 350. This optimization is possible because the routing logic used by these two interfaces is very similar. In one embodiment, routing logic block 350 includes logic blocks which are dependent on the port type and other blocks that are common to both port types. This optimization reduces the number of logic gates required on an ASIC. Routing block 350 determines where a frame is routed based on addressing information within the data frame. This function is known as address resolution and is performed for both Fibre Channel and Gigabit Ethernet data frames. Therefore, address resolution logic can be shared by these two port interfaces though it is necessary for the routing logic to select different data based on the port type. The logic within Routing Logic block 350 can be implemented as hard coded logic or as a programmable method using a network processor, which is designed specifically for processing packets and which can be programmed to route either Fibre Channel frames or Ethernet frames. Therefore, the routing logic hardware can be shared by using different network processor software. In one embodiment, routing logic block 350 also includes an input and output FIFO memory which is shared by the two port interfaces. Additional logic which can be shared include statistics registers and control registers. Statistics registers are used to count the number of frames received, frames transmitted, bytes received, bytes transmitted, etc. A common set of statistics registers can be used. These registers are modified by control signals from each MAC. Control registers determine the operating mode of each MAC. A common set of statistics and control registers reduces the logic required to implement the registers and for interfacing with an external control source such as a switch management CPU.

Figure 17:
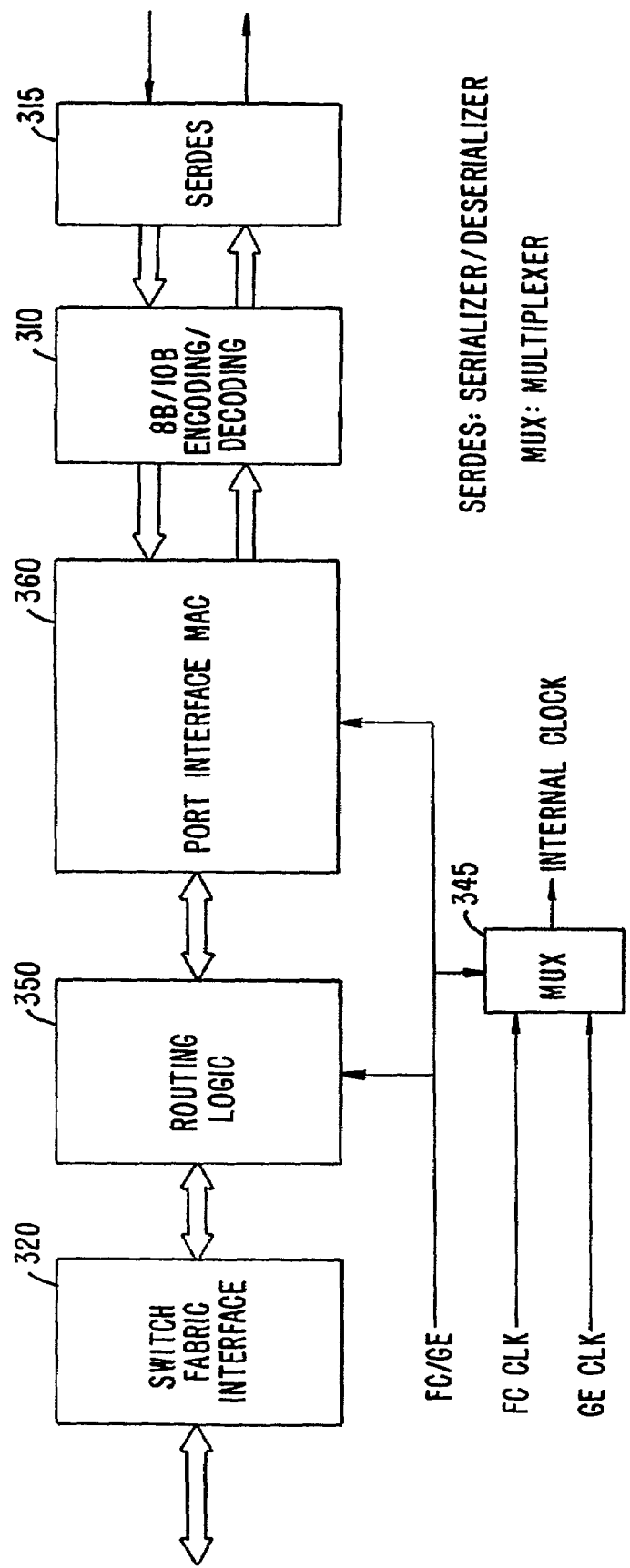
FIG. 17 is a high level block diagram which illustrates the basic architecture for a switch port that supports both Fibre Channel and Ethernet wherein low-level port interface logic blocks are combined according to an embodiment of the present invention.

In another embodiment as shown in FIG. 17, the low-level port interface logic (e.g., FC MAC block 325 and Ethernet MAC block 330) is combined into a single MAC block 360. One problem with this approach, however, is that these two logic blocks have little in common. In addition, it is possible to purchase proprietary blocks which implement Gigabit Ethernet MAC and Fibre Channel Port Interface logic. Combining these two blocks would severely hinder the use of these proprietary blocks.

Figure 18:
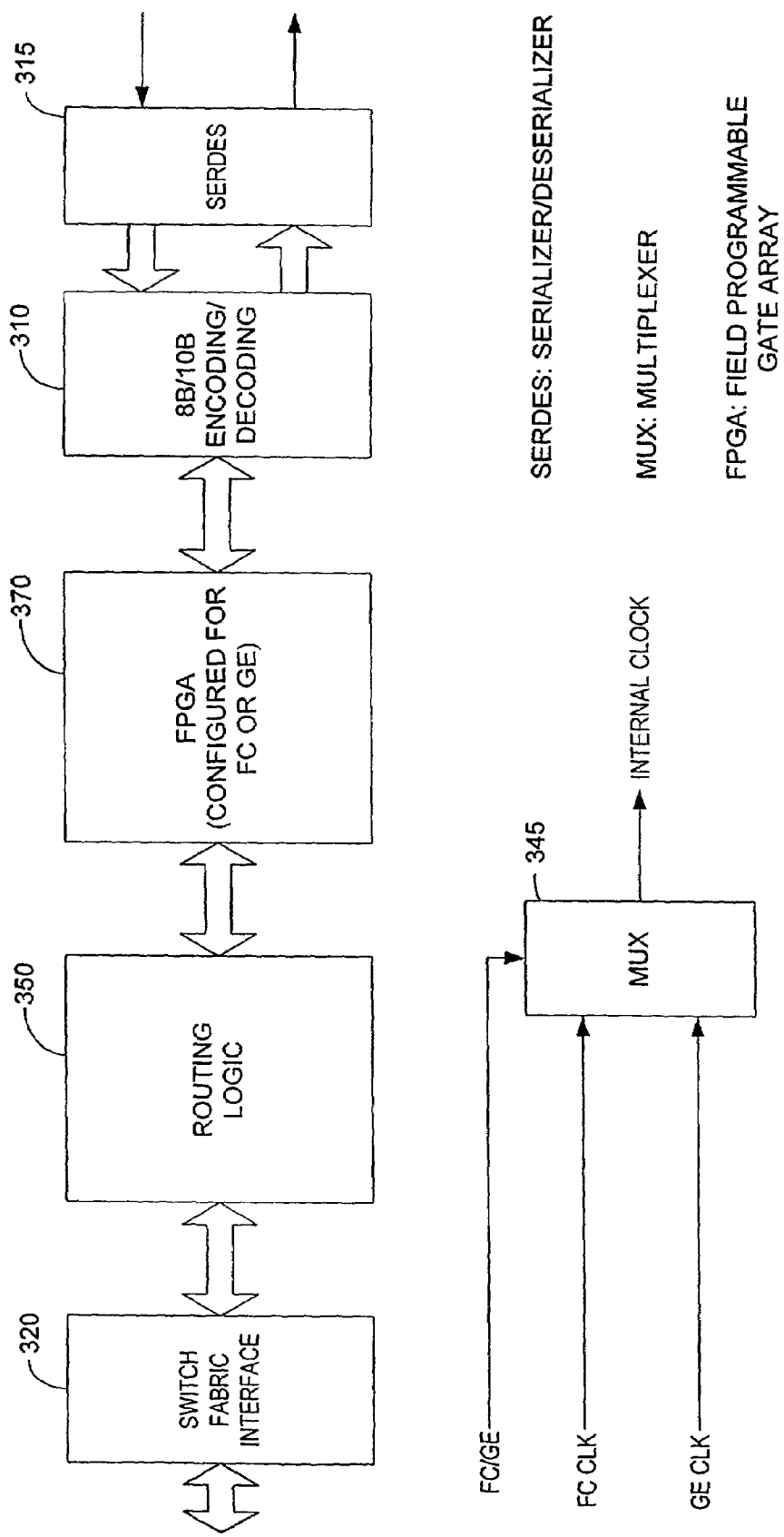
FIG. 18 is a high level block diagram which illustrates the basic architecture for a switch port that supports both Fibre Channel and Ethernet using a Field Programmable Gate Array (FPGA) according to an embodiment of the present invention.

According to another embodiment of the present invention as shown in FIG. 18, a Field Programmable Gate Array (FPGA) 370 is used to select the interface protocol supported by the port. The FPGA configuration loaded would be based on the port type. In this embodiment, separate FPGA code is developed for the Fibre Channel and Gigabit Ethernet interfaces. Thus, the FPGA logic can be optimized for the particular interface. A single hardware design supports both interfaces, with software determining the FPGA code to be downloaded based on the port type.

Figure 19:
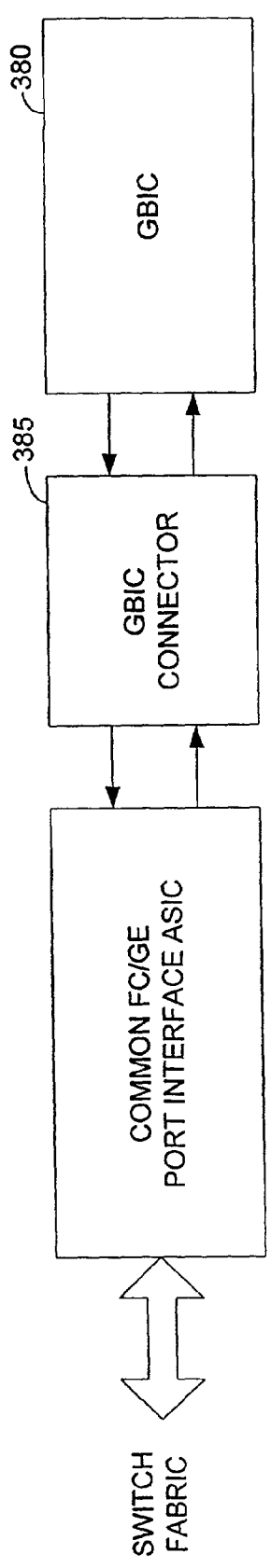
FIG. 19 shows a block diagram of a common FC/Gigabit Ethernet port combined with a GBIC interface according to an embodiment of the present invention.

A common port must also deal with the physical interface external to an ASIC. As is well known, such an interface may include, for example, a copper, multi-mode fibre or single-mode fibre interface. Also, the components are not necessarily the same between Fibre Channel and Ethernet. According to an embodiment of the present invention as shown in FIG. 19, a Gigabit Interface Converter (GBIC) 380 is provided to allow a user to select the desired physical interface. A GBIC is a standardized module which has a common form factor and electrical interface and allows any of the many physical interfaces to be installed. GBIC modules are available from many vendors (e.g. HP, AMP, Molex, etc.) and support all of the standard Fibre Channel and Gigabit Ethernet physical interfaces. FIG. 19 shows a block diagram of a common FC/Gigabit Ethernet port interface (e.g., as shown in FIGS. 15, 16, 17 and 18) combined with a GBIC interface according to this embodiment. The ASIC connects to a GBIC connector 385 which allows the user to change OBIC modules. Thus, the user can select the media type by installing the appropriate GBIC 380.

GBIC modules typically contain a serial EEROM whose contents can be read to determine the type of module (e.g. Fibre Channel, Gigabit Ethernet, Infiniband, Copper, Multimode, Single-mode, etc.). The GBIC can thus indicate the type of interface, e.g., FC or GE or Infiniband, to use. However, it is possible for the GBIC to support multiple interfaces, for example both FC and GE. Therefore, in one embodiment, the port interface type is user switchable/configurable, and in another embodiment the type of the link interface is automatically determined through added intelligence, for example, through a "handshake".

Figure 20:
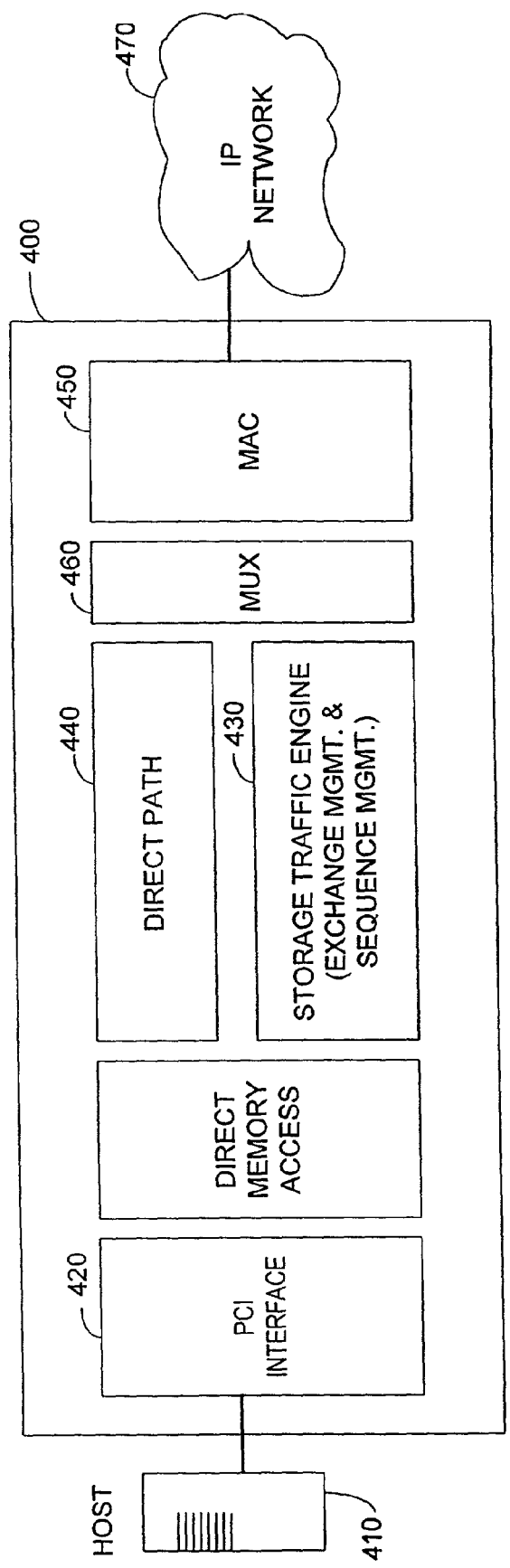
FIG. 20 illustrates the architecture of an intelligent network interface card (NIC) according to an embodiment of the present invention.

According to another embodiment of the present invention, an SoIP intelligent network interface card (NIC) 400 is provided as shown in FIG. 20. NIC card 400 is able to send and receive both IP and SoIP traffic. In either case, NIC card 400 has the intelligence to determine the type of traffic and direct it accordingly.

The host 410 may issue both storage commands and network commands to NIC card 400 through the PCI interface 420. These commands are sent with a specified address which is used to direct the commands to either the Direct Path or the Storage Traffic Engine. Storage commands are issued via the SCSI Command Set, and Network commands are issued via Winsock and/or TCP/IP.

NIC card 400 directs storage commands to the Storage Traffic Engine 430 based on the specified address. Storage Traffic Engine 430 handles the exchange management and sequence management for the duration of the SCSI operation. SCSI operations are then carried out via SoIP and transmitted to the network 470 via a media access controller (MAC) block 450, which in one embodiment is a Gigabit Ethernet MAC. NIC card 400 directs non-SoIP traffic to the Direct Path 440 based on the specified address. The Direct Path 440 processes the commands and transmits the specified packets to network 470 via block 450. When receiving data from network 470 via MAC 450, NIC 400 demultiplexes the traffic and directs it accordingly. Storage traffic received as SoIP is sent to storage traffic block 430. Non-SoIP traffic is sent directly to the host via direct path 440.

The multiplexer block 460 handles arbitration for the output path when both Direct Path 440 and Storage Traffic Engine 430 simultaneously send traffic to MAC 450. For traffic received from network 470 by MAC 450, Mux block 460 demultiplexes the traffic and sends it accordingly to either Direct Path 440 or Storage Traffic Engine 430.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A network device having one or more Fibre Channel (FC) ports and one or more IP ports, wherein the device is configured to encapsulate frames received from a first FC storage area network (SAN) on a first one of said FC ports in one or more IP datagrams using one of UDP and TCP as a transport protocol for delivery to a destination device on a second FC SAN via a first one of said IP ports, each received frame having a source FC address and a destination FC address, wherein each of said first and second FC SANs have locally administered addresses.

2. The device of claim 1, wherein the device is configured to encapsulate each received frame in one or more IP datagrams, each datagram including a source IP address, a destination IP address, a destination UDP port number and a source UDP port number based on the destination and source FC addresses in the frame being encapsulated.

3. The device of claim 1, wherein the device is configured to encapsulate each received frame in one or more IP datagrams, each datagram including a source IP address, a destination IP address, a destination TCP port number and a source TCP port number based on the destination and source FC addresses In the frame being encapsulated.

4. The device of claim 1, wherein the device is configured to encapsulate each received frame In one or more IP datagrams, each datagram Including a source IP address, and one of a source TCP port number and a source UDP port number based on the FC address In the frame being encapsulated.

5. The device of claim 1, wherein the device is configured to encapsulate each received frame in one or more IP datagrams, each datagram including a destination IP address, and one of a destination TCP port number and a destination UDP port number based on the destination FC address in the frame being encapsulated.

6. The device of claim 1, wherein within the first FC SAN the destination FC address identifies the destination device in the second FC SAN, wherein within the second FC SAN the destination device is identified by a second destination FC address different from the destination FC address, and wherein the device is configured to convert the destination FC address in a received frame to the second destination FC address.

7. The device of claim 6, wherein the received frame comprises a third party command.

8. The device of claim 7, wherein the third party command is a COPY command.

9. The device of claim 6, wherein the device is configured with a table in memory associating the destination FC address with the second FC address.

10. The device of claim 1, wherein the device is configured to de-encapsulate an FC frame received in an IP datagram from the second FC SAN over the first IP port, wherein each de-encapsulated FC frame has a source FC address and a destination FC address.

11. The device of claim 10, wherein within the second FC SAN the source FC address of the de-encapsulated FC frame identifies a source device in the second FC SAN, wherein within the first FC SAN the source device is identified by a second source FC address different from the source FC address of the de-encapsulated FC frame, wherein the device is configured to replace the source FC address of the de-encapsulated FC frame with the second source FC address based on address information from the IP datagram.

12. The device of claim 11, wherein the address information includes a source IP address, a destination IP address one of a destination TCP port number and a destination UDP part number, and one of source TCP port number and a source UDP port number.

13. The device of claim 10, wherein within the second FC SAN the destination FC address of the de-encapsulated FC frame identifies a destination device in the first FC SAN, wherein within the first FC SAN the destination device is identified by a second destination FC address different from the destination FC address of the de-encapsulated FC frame, wherein the device is configured to replace the destination FC address of the de-encapsulated FC frame with the second destination FC address based on address information from the IP datagram.

14. The device of claim 13, wherein the address information includes a source IP address, a destination IP address, one of a destination TCP port number and a destination UDP port number, and one of a source TCP port number and a source UDP port number.

15. The device of claim 1, wherein the device includes an address translation table having locally administered FC addresses stored in association with address information that uniquely identifies devices on the first and second FC SANs.

16. The device of claim 15, wherein the address Information includes IP addresses and socket numbers of the devices on the first and second FC SANs.

17. The device of claim 1, wherein the device is a network switch device coupling the first FC SAN to an IP network.

18. A method of transmitting data in a network device having one or more Fibre Channel (FC) ports and one or more IP ports, the method comprising:

receiving, on a first one of said FC ports, a frame from a source device in a first FC SAN, the frame having a source FC address and a destination FC address;

encapsulating the frame in one or more IP datagrams using one of UDP and TCP as a transport protocol; and transmitting the one or more IP datagrams to a second FC SAN via a first one of the IP ports, the IP datagrams being destined for a destination device on the second FC SAN, wherein each of the first and second SANs have locally administered FC addresses.

19. The method of claim 18, wherein encapsulating includes inserting in each datagram a source IP address and one of a source TCP port number and a source UDP port number based on the source FC address in the frame.

20. The method of claim 18, wherein encapsulating includes inserting in each datagram a destination IP address and one of a destination TCP port number and a destination UDP port number based on the destination FC address in the frame.

21. The method of claim 18, wherein within the first FC SAN the destination FC address identifies the destination device in the second FC SAN, wherein within the second FC SAN the destination device is identified by a second destination FC address different from the destination FC address, and wherein encapsulating includes replacing the destination FC address in the frame with the second destination FC address.

22. The method of claim 21, wherein the frame comprises all or a portion of a third party command.

23. The method of claim 22, wherein the third party command is a COPY command.

24. The method of claim 21, wherein replacing includes looking up the second destination FC address in a table associating the destination address with the second destination address.

25. The method of claim 18, wherein the network device is a network switch device coupling the first FC SAN to an IP network.

26. The method of claim 18, wherein the network device includes and address translation table having locally administered FC addresses stored in association with address information that uniquely identifies devices on the first and second FC SANs.

27. A method of transmitting data in a network device having one or more Fibre Channel (FC) ports and one or more IP ports, the method comprising:
receiving, on a first one of said IP ports, an IP datagram from a source device in a second FC SAN, the datagram using one of UDP and TCP as a transport protocol, the datagram having an encapsulated frame with a source FC address and a destination FC address;
de-encapsulating the encapsulated frame; and
transmitting the de-encapsulated frame to a first FC SAN via a first one of the FC ports, the de-encapsulated frame being destined for a destination device on the first FC-SAN, wherein each of the first and second SANs have locally administered FC addresses.

28. The method of claim 27, wherein within the second FC SAN the source FC address identifies a source device in the second FC SAN, wherein within the first FC SAN the source device is identified by a second source FC address different from the source FC address, wherein de-encapsulating includes replacing the source FC address with the second source FC address based on address information from the datagram.

29. The method of claim 28, wherein the address information includes a source IP address, a destination IP address, one of a destination TCP port number and a destination UDP port number, and one of a source TCP port number and a source UDP port number.

30. The method of claim 27, wherein within the second FC SAN the destination FC address identifies a destination device in the first FC SAN, wherein within the first FC SAN the destination device is identified by a second destination FC address different from the destination FC address, wherein de-encapsulation includes replacing the destination FC address with the second destination FC address based on address information from the datagram.

31. The method of claim 30, wherein the address information includes a source IP address, a destination IP address, one of a destination TCP port number and a destination UDP port number, and one of a source TCP port number and a source UDP port number.

* * * * *